United States Patent
Koike et al.

(10) Patent No.: US 9,798,068 B2
(45) Date of Patent: Oct. 24, 2017

(54) ILLUMINATION MODULE

(71) Applicants: KEIO UNIVERSITY, Tokyo (JP); Nittoh Inc., Suwa-shi, Nagano (JP)

(72) Inventors: Yasuhiro Koike, Yokohama (JP); Akihiro Tagaya, Yokohama (JP); Keiichi Mochizuki, Suwa (JP); Takashi Iwamoto, Suwa (JP); Kazumasa Osumi, Suwa (JP)

(73) Assignees: KEIO UNIVERSITY (JP); NITTOH INC. (JP)

( * ) Notice: Subject to any disclaimer, the term of this patent is extended or adjusted under 35 U.S.C. 154(b) by 0 days.

(21) Appl. No.: 14/830,791

(22) Filed: Aug. 20, 2015

(65) Prior Publication Data

US 2017/0052306 A1    Feb. 23, 2017

(51) Int. Cl.
*F21V 8/00* (2006.01)
*F21V 5/00* (2015.01)

(52) U.S. Cl.
CPC .............. *G02B 6/0051* (2013.01); *F21V 5/00* (2013.01); *G02B 6/009* (2013.01); *G02B 6/0031* (2013.01);
(Continued)

(58) Field of Classification Search
CPC .. G02B 6/0031; G02B 6/0038; G02B 6/0051; G02B 6/0061; G02B 6/0068; G02B 6/0078; G02B 6/009
See application file for complete search history.

(56) References Cited

U.S. PATENT DOCUMENTS 6,464,367 B2 * 10/2002 Ito ................. G02B 6/0031
                                              362/23.16
7,410,287 B2 *  8/2008 Chen ............. G02B 6/0065
                                              362/607
(Continued)

FOREIGN PATENT DOCUMENTS

JP    2004-310002 A    11/2004
JP    2006-120584 A     5/2006
(Continued)

OTHER PUBLICATIONS

Japanese Office Action for corresponding JP 2013-227289, dated Jul. 4, 2017 (7 pages).
(Continued)

*Primary Examiner* — Alan Cariaso
(74) *Attorney, Agent, or Firm* — Harness, Dickey & Pierce, P.L.C.

(57) ABSTRACT

Provided is an illumination module capable of preventing a light exit surface from being darker along peripheral edge portions as though having borders. An illumination module (1) includes: a light guiding plate (20), which has an end surface (21) and a first principal surface (23); a light source (30) configured to emit light that enters the end surface (21); and a diffusion plate (50), which has alight incident surface (55) and a light exit surface (56). The diffusion plate (50) includes a protruding part (51), which protrudes toward the light guiding plate (20) side and the light source (30), which is positioned so as to face a peripheral edge portion (26) on the end surface (21) side of the light guiding plate (20), and which has a light incident surface (52) into which light exiting the peripheral edge portion (26) enters.

38 Claims, 14 Drawing Sheets

(52) U.S. Cl.
CPC ......... *G02B 6/0038* (2013.01); *G02B 6/0061* (2013.01); *G02B 6/0068* (2013.01); *G02B 6/0078* (2013.01)

(56) References Cited

U.S. PATENT DOCUMENTS

| | | | |
|---|---|---|---|
| 7,488,104 | B2 | 2/2009 | Hamada et al. |
| 7,616,271 | B2 * | 11/2009 | Souk .................... G02B 6/0068 349/62 |
| 7,697,813 | B2 | 4/2010 | Lee et al. |
| 7,967,492 | B2 * | 6/2011 | Nagasawa ............... G02B 5/021 362/606 |
| 8,408,777 | B2 | 4/2013 | Kuwayama et al. |
| 8,459,857 | B2 | 6/2013 | Shibata et al. |
| 8,491,174 | B2 * | 7/2013 | Derichs ................ G02B 6/0011 362/612 |
| 8,858,060 | B2 | 10/2014 | Inagaki et al. |
| 8,926,160 | B2 * | 1/2015 | Iwasaki ................ G02B 6/0041 362/558 |
| 9,140,845 | B2 * | 9/2015 | Hwang ................ G02B 6/0051 |
| 2004/0161222 | A1 | 8/2004 | Niida et al. |
| 2007/0153548 | A1 | 7/2007 | Hamada et al. |
| 2008/0025686 | A1 | 1/2008 | Lee et al. |
| 2010/0302804 | A1 | 12/2010 | Inagaki et al. |
| 2011/0038178 | A1 | 2/2011 | Kuwayama et al. |
| 2011/0261585 | A1 | 10/2011 | Shibata et al. |

FOREIGN PATENT DOCUMENTS

| | | |
|---|---|---|
| JP | 2006-244825 A | 9/2006 |
| JP | 2007-087618 A | 4/2007 |
| JP | 2007-227065 A | 9/2007 |
| JP | 2008-015448 A | 1/2008 |
| JP | 2010-140912 A | 6/2010 |
| JP | 2010-218693 A | 9/2010 |
| JP | 2010-249993 A | 11/2010 |
| JP | 2011-009189 A | 1/2011 |
| JP | 2011-040278 A | 2/2011 |
| JP | 2011-249320 A | 12/2011 |
| JP | 2012-069355 A | 4/2012 |
| JP | 2012-248518 A | 12/2012 |

OTHER PUBLICATIONS

Japanese Office Action for corresponding JP 2015-219320, dated Jul. 4, 2017 (8 pages).
Japanese Office Action for corresponding JP 2015-219325, dated Jul. 4, 2017 (6 pages).
Japanese Office Action for corresponding JP2015-219328, dated Aug. 1, 2017 (8 pages).
Japanese Office Action for corresponding JP2015-219336, dated Aug. 1, 2017 (8 pages).

* cited by examiner

ILLUMINATION MODULE

BACKGROUND

The present invention relates to an illumination module.

Hitherto, with surface emitting devices that use a light emitting diode (LED) as a light source, there have been cases where light leaks from a gap between the LED light source and a light guiding plate, or impairing the appearance by that light transmitted through the light guiding plate is not reflected totally inside the light guiding plate, which causes exiting light to look like that of a point light source. An example of surface emitting devices that have been proposed as a solution (for example, Japanese Patent Application Laid-open No. 2007-227065) includes: a light guiding member having an end surface into which light from an LED light source enters and a light emitting surface as a light exit surface from which the incident light exits; and a multi-walled hollow member made up of a plurality of hollow cells through which light exiting the light emitting surface is transmitted, and uses a frame member to hold the peripheral edge portions of the light guiding member and the multi-walled hollow member as well as the LED light source.

In the surface emitting device of Japanese Patent Application Laid-open No. 2007-227065, where the peripheral edge portions of a light emitting surface are covered with the frame member, the light emitting surface is practically framed and, in addition, is darker at the peripheral edge portions toward the frame member than at the center, which make the light emitting surface look as though there is a border along the peripheral edge portions of the light emitting surface, thereby impairing the appearance.

SUMMARY

The present invention has been made in view of those problems, and an object of the present invention is therefore to provide an illumination module capable of preventing a light exit surface from being darker along peripheral edge portions as though having borders.

In order to solve the above-mentioned problems, an illumination module according to one embodiment of the present invention includes: a light guiding plate including an end surface and a first light exit surface; a light source aligned along the end surface, which is configured to emit light that enters the end surface; and a diffusion plate including a first light incident surface and a second light exit surface, the first light incident surface being a surface which is disposed on the first light exit surface side of the light guiding plate and into which light exiting the first light exit surface enters, the second light exit surface being a surface from which light entering the first light incident surface exits, the diffusion plate including a protruding part, which protrudes toward the light guiding plate side and which is positioned so as to face at least a peripheral edge portion on the end surface side of the first light exit surface of the light guiding plate where the light source is aligned, the protruding part including a second light incident surface into which light exiting the peripheral edge portion enters.

Further, in addition to the one embodiment of the present invention, the illumination module further includes a light shielding portion provided between the peripheral edge portion and the second light incident surface, which is configured to restrict how much of light exiting the peripheral edge portion enters the second light incident surface.

Further, in addition to the one embodiment of the present invention, the light shielding portion is provided in amounting member configured to mount the light source to the illumination module.

Further, in addition to the one embodiment of the present invention, the light source includes a plurality of light sources.

Further, in addition to the one embodiment of the present invention, the light shielding portion includes protruding portions and recessed portions alternated with each other along an alignment direction of the plurality of light sources, and the plurality of light sources are disposed in areas where the protruding portions are formed.

Further, in addition to the one embodiment of the present invention, the diffusion plate includes a wave-shaped concave-convex, which is formed on an internal side surface facing an outer peripheral end surface of the protruding part to run (extend) along an alignment direction of the plurality of light sources.

Further, in addition to the one embodiment of the present invention, the diffusion plate includes a plurality of V-shaped grooves, which are formed on the second light incident surface of the protruding part along an alignment direction of the plurality of light sources, and each of which stretches across the protruding part.

Further, in addition to the one embodiment of the present invention, the diffusion plate includes a wave-shaped concave-convex, which is formed on an internal side surface facing an outer peripheral end surface of the protruding part to run along the alignment direction of the plurality of light sources.

Further, in addition to the one embodiment of the present invention, the light guiding plate includes diffusion surfaces in an area that faces the second light incident surface of the protruding part, and the diffusion surfaces are each disposed between two adjacent light sources out of the plurality of light sources.

Further, in addition to the one embodiment of the present invention, each of the diffusion surfaces includes an aggregation of minute lens-shaped concaves and convexes, or an aggregation of V-shaped grooves.

Further, in addition to the one embodiment of the present invention, the lens-shaped concaves and convexes, or the V-shaped grooves, of each of the diffusion surfaces are arranged so as to become denser toward the end surface side where the light source is disposed at a midpoint between the adjacent light sources, and to become sparser as a distance from the midpoint or a position of the end surface grows.

Further, in addition to the one embodiment of the present invention, an outer peripheral end surface of the diffusion plate is disposed in the same plane where an outer peripheral end surface of the light guiding plate and an external side surface of a mounting member configured to mount the light source to the illumination module are disposed, or protrudes farther than the outer peripheral end surface of the light guiding plate and the external side surface.

Further, in addition to the one embodiment of the present invention, a ratio of an amount of light that enters the second light incident surface to a total amount of light that enters the diffusion plate is within ±60% of a ratio of areal dimensions of the second light incident surface to total areal dimensions of the diffusion plate which is a sum of areal dimensions of the first light incident surface and of the second light incident surface.

Further, in addition to the one embodiment of the present invention, the light source is an LED light source.

In order to solve the above-mentioned problems, a panel-type illumination device according to one embodiment of the present invention includes a plurality of the illumination modules, the plurality of the illumination modules being aligned by putting an end surface of the light guiding plate of one illumination module along which no light source is disposed in close contact with an end surface of the light guiding plate of another illumination module along which no light source is disposed.

In order to solve the above-mentioned problems, an illumination module according to one embodiment of the present invention includes: a light guiding plate including end surfaces and a first light exit surface; a light source aligned along each of some of the end surfaces, which is configured to emit light that enters the end surface; a reflecting member disposed in a part the end surface along which no light source is disposed, which is configured to reflect light that has been emitted by the light source and has entered an interior of the light guiding plate back to the interior of the light guiding plate; and a diffusion plate including a first light incident surface and a second light exit surface, the first light incident surface being a surface which is disposed on the first light exit surface side of the light guiding plate and into which light exiting the first light exit surface enters, the second light exit surface being a surface from which light entering the first light incident surface exits, the diffusion plate including a protruding part, which protrudes toward the light guiding plate side and which is positioned so as to face at least a peripheral edge portion on the end surface side of the first light exit surface of the light guiding plate where the light source is aligned, the protruding part including a second light incident surface into which light exiting the peripheral edge portion enters.

Further, in addition to the one embodiment of the present invention, the illumination module further includes a light shielding portion provided between the peripheral edge portion and the second light incident surface, which is configured to restrict how much of light exiting the peripheral edge portion enters the second light incident surface.

Further, in addition to the one embodiment of the present invention, the light shielding portion is provided in amounting member configured to mount the light source to the illumination module.

Further, in addition to the one embodiment of the present invention, the light source includes a plurality of light sources.

Further, in addition to the one embodiment of the present invention, the light shielding portion includes protruding portions and recessed portions alternated with each other along an alignment direction of the plurality of light sources, and the plurality of light sources are disposed in areas where the protruding portions are formed.

Further, in addition to the one embodiment of the present invention, the diffusion plate includes a wave-shaped concave-convex, which is formed on an internal side surface facing an outer peripheral end surface of the protruding part to run along an alignment direction of the plurality of light sources.

Further, in addition to the one embodiment of the present invention, the diffusion plate includes a plurality of V-shaped grooves, which are formed on the second light incident surface of the protruding part along an alignment direction of the plurality of light sources, and each of which stretches across the protruding part.

Further, in addition to the one embodiment of the present invention, the diffusion plate includes a wave-shaped concave-convex, which is formed on an internal side surface facing an outer peripheral end surface of the protruding part to run along the alignment direction of the plurality of light sources.

Further, in addition to the one embodiment of the present invention, the light guiding plate includes diffusion surfaces in an area that faces the second light incident surface of the protruding part, and the diffusion surfaces are each disposed between two adjacent light sources out of the plurality of light sources.

Further, in addition to the one embodiment of the present invention, each of the diffusion surfaces includes an aggregation of minute lens-shaped concaves and convexes, or an aggregation of V-shaped grooves.

Further, in addition to the one embodiment of the present invention, the lens-shaped concaves and convexes, or the V-shaped grooves, of each of the diffusion surfaces are arranged so as to become denser toward the end surface side where the light source is disposed at a midpoint between the adjacent light sources, and to become sparser as a distance from the midpoint or a position of the end surface grows.

Further, in addition to the one embodiment of the present invention, an outer peripheral end surface of the diffusion plate is disposed in the same plane where an outer peripheral end surface of the light guiding plate and an external side surface of the mounting member are disposed, or protrudes farther than the outer peripheral end surface of the light guiding plate and the external side surface.

Further, in addition to the one embodiment of the present invention, a ratio of an amount of light that enters the second light incident surface to a total amount of light that enters the diffusion plate is within ±60% of a ratio of areal dimensions of the second light incident surface to total areal dimensions of the diffusion plate which is a sum of areal dimensions of the first light incident surface and of the second light incident surface.

Further, in addition to the one embodiment of the present invention, the light source is an LED light source.

In order to solve the above-mentioned problems, a panel-type illumination device according to one embodiment of the present invention includes a plurality of the illumination modules, the plurality of the illumination modules being aligned by putting an end surface of the light guiding plate of one illumination module along which no light source is disposed in close contact with an end surface of the light guiding plate of another illumination module along which no light source is disposed.

DESCRIPTION OF EXEMPLARY EMBODIMENTS

Now, a description is given of an illumination module 1 according to embodiments of the present invention with reference to the drawings.

First Embodiment

Figure 1:
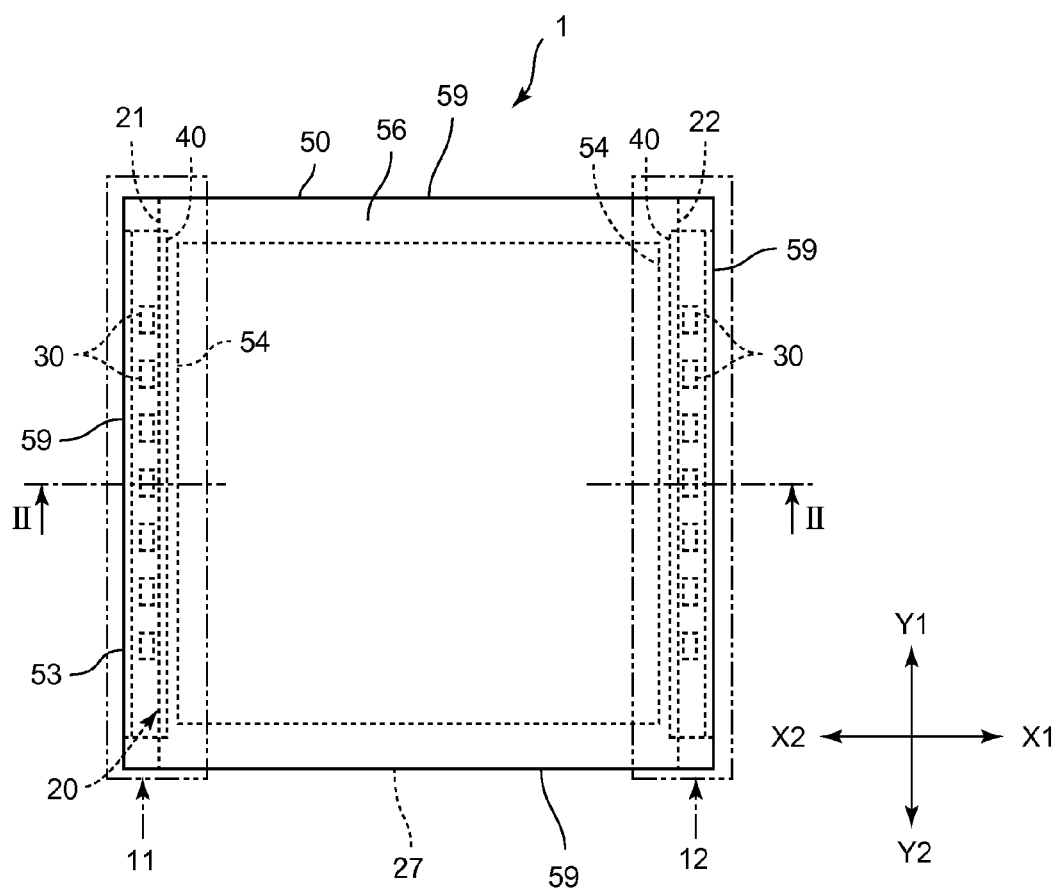
FIG. 1 is a plan view of an illumination module according to a first embodiment of the present invention.
Figure 2:
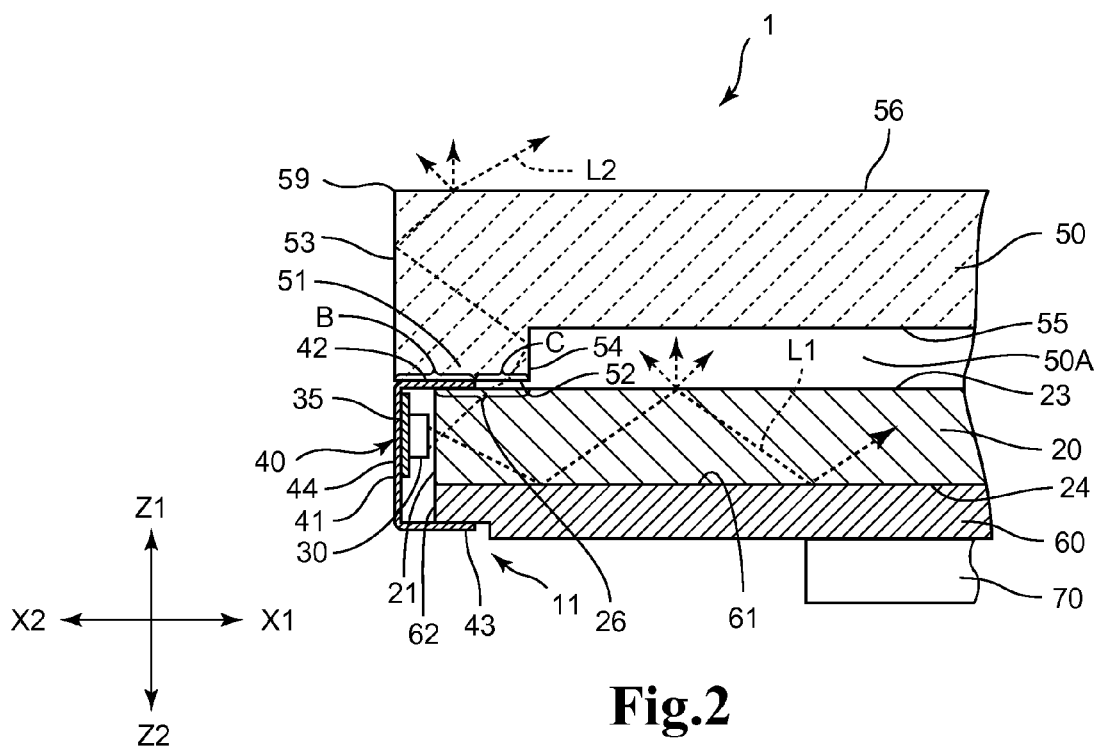
FIG. 2 is a partial sectional and end view of a first light source portion on the left side out of an end view taken along the line II-II of FIG. 1.

FIG. 1 is a plan view of an illumination module 1 according to a first embodiment of the present invention. FIG. 2 is a partial sectional view of a first light source portion 11 on the left side out of a sectional view taken along the line A-A of FIG. 1. In the following description of the embodiments of the present invention, the arrow view direction X1 and the arrow view direction X2 are defined as the right side and the left side, respectively, the arrow view direction Y1 and the arrow view direction Y2 are defined as the back side and the front side, respectively, and the arrow view direction Z1 and the arrow view direction Z2 are defined as the upward direction (top side) and the downward direction (bottom side), respectively. The arrow view direction Z1 and the arrow view direction Z2 are also referred to as front side and rear side, respectively.

As illustrated in FIG. 1, the illumination module 1 includes the first light source portion 11 on the left side and a second light source portion 12 on the right side. The first light source portion 11 and the second light source portion 12 are arranged so as to face each other, but can share the same structure. The first light source portion 11 on the left side is therefore taken as an example in the description of the embodiments which is given with reference to FIG. 2 and subsequent drawings.

The illumination module 1 of the first embodiment has a quadrangular outline when viewed from above, and has a panel shape that is flat in the up-down direction. As illustrated in FIG. 1 and FIG. 2, the illumination module 1 includes, among others, a light guiding plate 20, a plurality of LED light sources 30 aligned along a left end surface 21 of the light guiding plate 20, a frame 40, which serves as an mounting portion for supporting the LED light sources 30 and simultaneously blocking light that is emitted by the LED light sources 30 from directly entering a diffusion plate 50, and the diffusion plate 50, which is overlaid on the front side of the light guiding plate 20. The first light source portion 11 is a part of the illumination module 1 where the left end surface 21, the LED light sources 30, the frame 40, a protruding part 51 of the diffusion plate 50, and a peripheral edge portion 26 of the light guiding plate 20 are disposed. The peripheral edge portion 26 faces the protruding part 51. The protruding part 51 is in a beam-like shape in the first embodiment and the others.

This embodiment takes as an example the case where the LED light sources 30 are used as a light source but is not limited to any particular type of light source. A cold cathode fluorescent lamp (CCFL), a light bulb (for example, incandescent bulb), a fluorescent tube, or the like may instead be used as a light source. However, LED light sources, which are small in power consumption and the amount of heat generated, easy to reduce in size, and low in cost, are superior to other light sources. The following description of the embodiments therefore also takes as an example the case where the LED light sources 30 are used as a light source.

The illumination module 1 in the first embodiment has a reflector plate 60, which is disposed on the rear side (opposite from the diffusion plate 50) of the light guiding plate 20. A circuit 70 for controlling the driving of the LED light sources 30 is disposed on the rear side of the reflector plate 60. The reflector plate 60 may be a reflector sheet or may be omitted.

The light guiding plate 20 includes the left end surface 21 and a right end surface 22 into which light emitted by the LED light sources 30 enters, a first principal surface 23, which serves as a first light exit surface facing the diffusion plate 50, and a second principal surface 24, which is a surface facing the first principal surface 23 (that is, the rear surface). The end surfaces 21 and 22 are incident surfaces into which light emitted by the LED light sources 30 enters. The first principal surface 23 is a light exit surface from which light exits the light guiding plate 20 toward the diffusion plate 50. The second principal surface 24 is in close contact with the reflector plate 60 to function as a light reflecting surface that reflects light traveling inside the light guiding plate 20. Used as the light guiding plate 20 is a light scattering, light guiding member that contains a large number of light scattering particles, which are described later.

Through the use of a light scattering, light guiding member as the light guiding plate 20, light that enters the interior of the light guiding plate 20 is scattered inside the light guiding plate 20 so that the illuminance distribution of light exiting the first principal surface 23 is evened out.

The plurality of LED light sources 30 are aligned along the left end surface 21 of the light guiding plate 20 at approximately regular intervals, and another set of the plurality of LED light sources 30 is aligned along the right end surface 22 of the light guiding plate 20 at approximately regular intervals. The LED light sources 30 are placed within the extent of the thickness of the light guiding plate 20, more desirably, at or close to the center in the thickness direction of the light guiding plate 20. The amount of light that exits the first principal surface 23 is larger when the LED light sources 30 are placed at the center in the thickness direction of the light guiding plate 20 than when the LED light sources 30 are not.

While there are seven LED light sources 30 on the left side and right side of the light guiding plate 20 each in the example of FIG. 1, the number of the LED light sources 30 is determined suitably by the size of the illumination module 1 in a plan view and the required brightness.

Each of LED elements that form the LED light sources 30 in this embodiment is a white LED element, and an input signal from the control circuit 70 is used to control light emission from each LED element. Alternatively, the LED elements used may be a red LED element, a green LED element, and a blue LED element that are packaged into one LED lamp. An input signal from the control circuit 70 in this case can be used to cause the illumination module 1 to emit light in a specified color by controlling which color LED element is allowed to emit light or mixing colors. The LED light sources 30 are mounted on an LED substrate 35, which is supported by a base portion 41 of the frame 40 serving as a mounting member.

The frame 40 is a metal plate bent and folded into a shape, and includes the base portion 41, which runs along the end surface 21, a light shielding portion 42, which extends from the base portion 41 toward the first principal surface 23 of the light guiding plate 20, and a light shielding portion 43, which extends toward the reflector plate 60. The frame 40 is mounted to the illumination module 1 by holding the light guiding plate 20 and the reflector plate 60 between the light shielding portion 42 and the light shielding portion 43. The frame 40 also keeps the light guiding plate 20 and the reflector plate 60 in close contact with each other by holding the light guiding plate 20 and the reflector plate 60 between the light shielding portion 42 and the light shielding portion 43. The light shielding portion 42 has a light shielding function for preventing light that is emitted by the LED light sources 30 from directly entering the diffusion plate 50, that is, a function of preventing light of the LED light sources 30 from directly entering the diffusion plate 50, which is disposed above the LED light sources 30 in the drawing. The light shielding portion 43 has a light shielding function for preventing leakage of light from the LED light sources 30 to the outside on the rear side of the reflector plate 60.

The reflector plate 60 is a plate member that has substantially the same shape as that of the light guiding plate 20 in the plan view. The reflector plate 60 is in close contact with the second principal surface 24 of the light guiding plate 20, and reflects light that travels inside the light guiding plate 20 at a reflective surface 61. A left end surface 62 of the reflector plate 60, which is aligned with the left end surface 21 of the light guiding plate 20 in the example of FIG. 2, may instead extend to a point below the LED light sources 30. The same applies to the right side of the reflector plate 60.

The diffusion plate 50 has a quadrangular shape in the plan view, and defines the size and shape in the plan view of the illumination module 1 in this embodiment. Specifically, the diffusion plate 50 is placed in the same plane where an outer peripheral end surface 27 (the end surface 21, the end surface 22, a front end surface, and a back end surface) of the light guiding plate 20 and an external side surface 44 of the frame 40 are disposed, or protrudes to the left and right of and in front of and behind the outer peripheral end surface 27 and the external side surface 44. The part of the protruding part 51, which protrudes toward the first principal surface 23 of the light guiding plate 20, is formed in the diffusion plate 50. The part of the protruding part 51 is formed in the first light source portion 11 on the left side and the second light source portion 12 on the right side each. The part of the protruding part 51 is positioned so as to face the peripheral edge portion 26 of the light guiding plate 20 which is on the side where the LED light sources 30 are disposed. A flat of bottom side of the protruding part 51 which faces the light guiding plate 20 is a light incident surface 52. The light incident surface 52 is a second light incident surface through which light exiting the first principal surface 23 of the light guiding plate 20 as the first light exit surface enters the protruding part 51. The peripheral edge portion 26 is a portion that faces the light incident surface 52 of the protruding part 51. While the protruding part 51 in the illumination module 1 according to this embodiment is formed along the entire outer periphery (four sides) of the diffusion plate 50, the protruding part 51 may be formed in each of a left peripheral edge portion and a right peripheral edge portion among the peripheral edge portions of the diffusion plate 50 which are on the sides where the LED light sources 30 are disposed. Forming the protruding part 51 along the entire outer periphery enhances the rigidity of the diffusion plate 50. The protruding part 51 may be formed to cover the LED light sources 30. In this case, the length of the protruding part 51 may be made the distance from one side of an outer peripheral edge 59 to the other side of the outer peripheral edge 59 equally and it may be done shorter than the distance of the above.

A recessed portion 50A is formed between the left protruding part 51 and the right protruding part 51 in a sectional and end view of the diffusion plate 50 taken along the line II-II of FIG. 1, namely, a section on a plane orthogonal to a direction in which the LED light sources 30 are aligned. A bottom surface of the recessed portion 50A (a surface that faces the first principal surface 23) is a protruding part internal bottom surface 55. The protruding part internal bottom surface 55 is a first light incident surface into which light exiting the first principal surface 23 enters. An outer peripheral end surface 53 is in contact with air. An internal side surface 54 faces the recessed portion 50A and is in contact with air. Accordingly, light that enters the outer peripheral end surface 53 from inside the protruding part 51 at an angle that exceeds a critical angle is reflected totally by the outer peripheral end surface 53. Light that enters the internal side surface 54 from inside the protruding part 51 at an angle that exceeds a critical angle is reflected totally by the internal side surface 54. The outer peripheral end surface 53 and the internal side surface 54 are parallel to each other, and the light incident surface 52 is orthogonal to the outer peripheral end surface 53 and the internal side surface 54. Light scattering, light guiding member that contains a large number of light scattering particles is used for the diffusion plate 50. With a light scattering, light guiding member used for the diffusion plate 50, light that enters the inside of the diffusion plate 50 is scattered in the diffusion plate 50, thereby evening out the illuminance distribution of light that exits a light exit surface 56, which is a second light exit surface.

The light incident surface 52 of the protruding part 51 has a shielding area B, where the light shielding portion 42 blocks light exiting the LED light sources 30 or the first principal surface 23 (particularly the peripheral edge portion 26), and an incident area C, where the exiting light enters without being blocked by the light shielding portion 42. In other words, placing the light shield portion 42 between the light incident surface 52 of the protruding part 51 and the peripheral edge portion 26 of the light guiding plate 20 which is on the side where the LED light sources 30 are disposed enables the illumination module 1 to control the amount of light that enters the light incident surface 52 out of light that exits the peripheral edge portion 26. The shielding area B has the breadth (the width dimension in the left-right direction) which is at least enough to prevent light that is emitted by the LED light sources 30 from entering the diffusion plate 50 directly, as opposed to entering the diffusion plate 50 via the light guiding plate 20. The breadth (the width dimension in the left-right direction) of the shielding area B and the breadth (the width dimension in the left-right direction) of the incident area C in this embodiment are set so that the brightness is uniform throughout the light exit surface 56 when light that has entered the light incident surface 52 from the first principal surface 23 exits the light exit surface 56. Most of the light that enters the light incident surface 52 from the first principal surface 23 exits from a peripheral edge portion of the light exit surface 56. The breadth of the shielding area B and the breadth of the incident area C are set so that the brightness at the peripheral edge portion of the light exit surface 56 approaches the brightness in the inner portion of the light exit surface 56.

The diffusion plate 50 comes into close contact with the light shielding portion 42 of the frame 40 at the light incident surface 52 of the protruding part 51. In the illumination module 1, the light guiding plate 20, the reflector plate 60, and the frame 40 are fixed by holding the ends (the end surface 21 and the end surface 62) of the light guiding plate 20 and the reflector plate 60 which are put on top of each other between the light shielding portion 42 and light shielding portion 43 of the frame 40, and piercing the light guiding plate 20 with a screw (not shown) from the light shielding portion 43 side. An adhesive high in light transmittance may be used on the contact surfaces between the light guiding plate 20, the reflector plate 60, and the frame 40 to fix and join the three into one structure. The diffusion plate 50 can be fixed to the light shielding portion 42 of the frame 40 by using an adhesive on the shielding area B of the light incident surface 52.

A description is given next with reference to FIG. 1 and FIG. 2 on a light path that light emitted by the LED light sources 30 and exiting the light exit surface 56 takes in the illumination module 1 of the first embodiment. A part of light emitted by the LED light sources 30 of the first light source portion 11 on the left side enters the interior of the light guiding plate 20 from the end surface 21 of the light guiding plate 20, travels to the right side while being reflected totally by the first principal surface 23 and the second principal surface 24 of the light guiding plate 20 as indicated by the broken line L1, for example, and while being scattered by the light scattering particles, and eventually exits from the first principal surface 23 in a diffused state. Another part of the light emitted by the LED light sources 30 of the first light source portion 11 travels while being scattered by the light scattering particles without being reflected totally by the first principal surface 23 or the second principal surface 24, and exits from the first principal surface 23 in a diffused state.

Similarly to the light emitted on the left side, light that is emitted by the LED light sources 30 of the second light source portion 12 on the right side enters the interior of the light guiding plate 20 from the right end surface 22 of the light guiding plate 20. The light that has entered the interior of the light guiding plate 20 is reflected totally by the first principal surface 23 and the second principal surface 24 of the light guiding plate 20 and scattered by the light scattering particles to eventually exit from the first principal surface 23.

The light emitted by the LED light sources 30 of the first light source portion 11 and the light emitted by the LED light sources 30 of the second light source portion 12 which enter the light guiding plate 20 and exit the first principal surface 23 in a diffused state are evened out in luminance through total reflection at the first principal surface 23 and the second principal surface 24 and the scattering by the light scattering particles which take place inside the light guiding plate 20.

The light exiting the first principal surface 23 of the light guiding plate 20 enters the internal bottom surface 55 of the diffusion plate 50 and the light incident surface 52 of the protruding part 51 of the diffusion plate 50, and travels inside the diffusion plate 50, and exits from the light exit surface 56. The diffusion plate 50 contains light scattering particles, and light that enters the diffusion plate 50 is scattered inside the diffusion plate 50, thereby evening out the illuminance distribution of light that exits the light exit surface 56.

Light emitted by the LED light sources 30 is bright at a point close to the LED light sources 30 and becomes darker as the distance from the LED light sources 30 grows. In the illumination module 1 of the first embodiment, which has the first light source portion 11 on the left side and the second light source portion 12 on the right side, there are light that travels toward the right side and light that travels toward the left side, and the brightness on the first principal surface 23 of the light guiding plate 20 is made uniform by complementation between the light from the left side and the light from the right side.

As illustrated in FIG. 2, the light shielding portion 42 of the frame 40 is disposed on the peripheral edge portion 26 of the light guiding plate 20 which is close to the LED light sources 30. The light shielding portion 42 restricts how much light enters the protruding part 51 from the LED light sources 30 and from the peripheral edge portion 26, and a part of the light incident surface 52 is the shielding area B. In short, a part of light emitted by the LED light sources 30 and traveling toward the light incident surface 52 is blocked by the shielding area B, i.e., the light shielding portion 42. The incident area C, on the other hand, allows a part of light exiting the first principal surface 23 toward the light incident surface 52 of the protruding part 51 to enter. A part of the light entering the light incident surface 52 of the protruding part 51 travels as indicated by the broken line L2 while being reflected totally by the internal side surface 54 and the outer peripheral end surface 53 of the protruding part 51 and while being scattered by the light scattering particles, and exits from the light exit surface 56 of the diffusion plate 50, mainly a portion above where the protruding part 51 is disposed, that is, a peripheral edge portion of the light exit surface 56 on the side where the LED light sources 30 are disposed. In short, apart of light entering the interior of the protruding part 51 travels while being reflected totally by the internal side surface 54 and the outer peripheral end surface 53 and while being scattered by the light scattering particles to exit from the light exit surface 56 in a diffused state. Most of the light entering the protruding part 51 exits from a portion above where the protruding part 51 is disposed.

The shielding area B is formed by way of the light shielding portion 42 of the frame 40 in the illumination module 1 according to the first embodiment described above. This prevents light that is emitted by the LED light sources 30 from directly entering the diffusion plate 50. Apart of light entering the light guiding plate 20 is reflected totally by the first principal surface 23 and the second principal surface 24 of the light guiding plate 20 and is also scattered by the light scattering particles to exit the first principal surface 23 as diffused light, which then enters the diffusion plate 50. The light that has exited the first principal surface 23 is transmitted through and further diffused by the diffusion plate 50 to exit from the light exit surface 56. The illumination module 1 is also provided with the protruding part 51, which is formed at a peripheral edge portion of the diffusion plate 50 on the side where the LED light sources 30 are disposed. Providing the protruding part 51 creates the outer peripheral end surface 53 and the internal side surface 54, which are in contact with air. Accordingly, a part of light exiting the peripheral edge portion 26 of the light guiding plate 20 and entering the light incident surface 52 of the protruding part 51 travels while being reflected totally by the internal side surface 54 and the outer peripheral end surface 53 of the protruding part 51 and while being scattered by the light scattering particles to exit as diffused light from a peripheral edge portion of the light exit surface 56 of the diffusion plate 50.

In short, forming the shielding area B by way of the light shielding portion 42 causes light that is emitted by the LED light sources 30 to enter the light guiding plate 20, instead of allowing the emitted light to directly enter the diffusion plate 50. A part of the light entering the light guiding plate 20 is reflected totally by the first principal surface 23 and the second principal surface 24 of the light guiding plate 20 and is scattered by the light scattering particles to exit from the first principal surface 23 as diffused light, and enter the diffusion plate 50. This prevents the LED light sources 30 from appearing like point light sources when the light exit surface 56 from which light is exiting is viewed.

In addition, the protruding part 51 is formed in a peripheral edge portion of the diffusion plate 50 on the side where the LED light sources 30 are disposed to lead light exiting the peripheral edge portion 26 of the light guiding plate 20 into the protruding part 51 from the light incident surface 52 of the protruding part 51, and the led light is reflected totally by the internal side surface 54 and the outer peripheral end surface 53 of the protruding part 51 and scattered by the light scattering particles to exit as diffused light from a peripheral edge portion of the light exit surface 56 of the diffusion plate 50. This prevents the light shielding portion 42 from blocking light and creating a dark border along a peripheral edge portion of the light exit surface 56 on the side where the light shielding portion 42 is provided.

The illumination module 1 provided by the present invention thus has a uniform brightness throughout the light exit surface 56 including the peripheral edge portions, while eliminating the chance of the LED light sources 30 appearing as point light sources and thereby impairing the appearance, and without allowing the light exit surface to be darker along peripheral edge portions as though having borders.

The size of the light incident area C of the protruding part 51 can be adjusted by increasing or reducing the width dimension of the protruding part 51. By adjusting the amount of light that enters the protruding part 51 after exiting the light guiding plate 20 through the adjustment of the size of the incident area C, the brightness is easily evened out between the central portion and peripheral edge portions of the light exit surface of the diffusion plate 50.

Specifically, adjusting the width (dimension in the left-right direction) of the incident area C adjusts the amount of light that enters the protruding part 51 from the first principal surface 23, thereby adjusting the amount of light that exits from a peripheral edge portion of the light exit surface 56 of the diffusion plate 50. For example, the difference between the amount of light that exits from a peripheral edge portion of the light exit surface 56 of the diffusion plate 50 and the amount of light that exits from an inner portion of the light exit surface 56 can be reduced by adjusting the width (dimension in the left-right direction) of the incident area C, thus making the illuminance uniform throughout the light exit surface 56. An adjustment of the width (dimension in the left-right direction) of the incident area C can be made by adjusting the width of the light shielding portion 42.

The shielding area B in the illumination module 1 of this embodiment is formed by way of the light shielding portion 42, which is provided in the frame 40. Alternatively, the shielding area B may be formed by, for example, sticking a piece of tape that has light shielding properties to the light incident surface 52 or applying paint that has light shielding properties to the light incident surface 52. Providing the light shielding portion 42 in the frame 40 reduces materials by omitting the tape or the paint, and allows for omitting the step of sticking the tape or the step of applying the paint.

Figure 3:
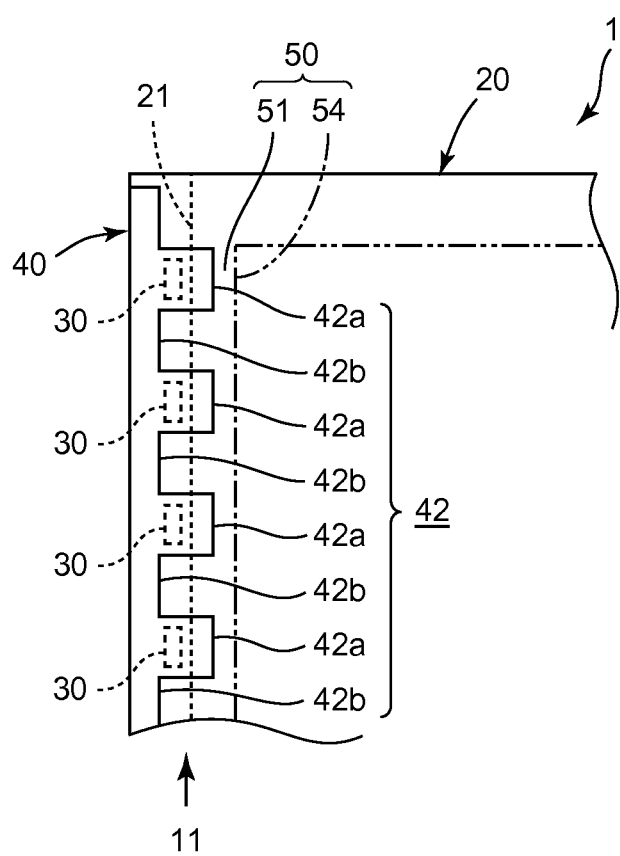
FIG. 3 is a partial plan view of a frame according to another Example of the first embodiment.

In the illumination module 1 according to the first embodiment, the shape of the light shielding portion 42 of the frame 40 can be modified to make the brightness on the light exit surface 56 uniform even more. This is described through Example. FIG. 3 is a partial plan view of the frame 40 in another Example of the first embodiment. The structures of the light guiding plate 20 and the diffusion plate 50 are the same as those in the description given above on the first embodiment, and descriptions thereof are omitted by using the same reference symbols to denote portions that are common to Example described below. As illustrated in FIG. 3, the light shielding portion 42 of the frame 40 includes protruding portions 42a and recessed portions 42b, which are disposed alternatingly along the alignment direction of the plurality of LED light sources 30. The protruding portions 42a cover the tops of the LED light sources 30 on the diffusion plate 50 side to block light emitted by the LED light sources 30 from directly entering the protruding part 51 of the diffusion plate 50 in a stretch where the protruding portions 42a are formed. The recessed portions 42b each provide an opening between the LED light sources 30 that are adjacent to each other, and light emitted by the LED light sources 30 detours around the protruding portions 42a to enter the protruding part 51 of the diffusion plate 50.

As described above, the light shielding portion 42 of the frame 40 in this example has the protruding portions 42a, which block light emitted by the LED light sources 30, and the recessed portions 42b, which provide openings. This way, the difference in the brightness of light that enters the protruding part 51 between a point close to the LED light sources 30 and a point distant from the LED light sources 30 in an area between the LED light sources 30 is made smaller than when the light shielding portion 42 of the frame 40 does not have the protruding portions 42a and recessed portions 42b of FIG. 3. As a result, the illumination module 1 in which the brightness is made even more uniform throughout the light exit surface 56 is provided.

The protruding portions 42a may each have, instead of a rectangular shape as illustrated in FIG. 3, a trapezoidal shape or a triangular shape which is tapered, or a round tip, as long as the shape and longitudinal and lateral dimensions set to the protruding portions 42a allow the protruding portions 42a used in combination with the recessed portions 42b to reduce the difference in the brightness of light that enters the protruding part 51. The frame 40 of this example which includes the protruding portions 42a and the recessed portions 42b can be used in the embodiments described below.

Second Embodiment

An illumination module 2 according to a second embodiment of the present invention is described next with reference to FIG. 4. The illumination module 2 of the second embodiment includes, though not shown, the same components as those in the first embodiment which are, among others, the light guiding plate 20, the plurality of LED light sources 30 aligned along the end surface 21 of the light guiding plate 20, the frame 40 for supporting the LED light sources 30 and simultaneously blocking light that exits the peripheral edge portion 26 of the light guiding plate 20 that is on the left side, and the diffusion plate 50, which is overlaid on the light guiding plate 20. The illumination module 2 of the second embodiment differs from the first embodiment mainly in the structure of the diffusion plate 50. The description given here therefore focuses on the difference by comparing the second embodiment with the first embodiment. Components common to the second embodiment and the first embodiment are denoted by the same reference symbols to omit or simplify descriptions thereof.

Figure 4:
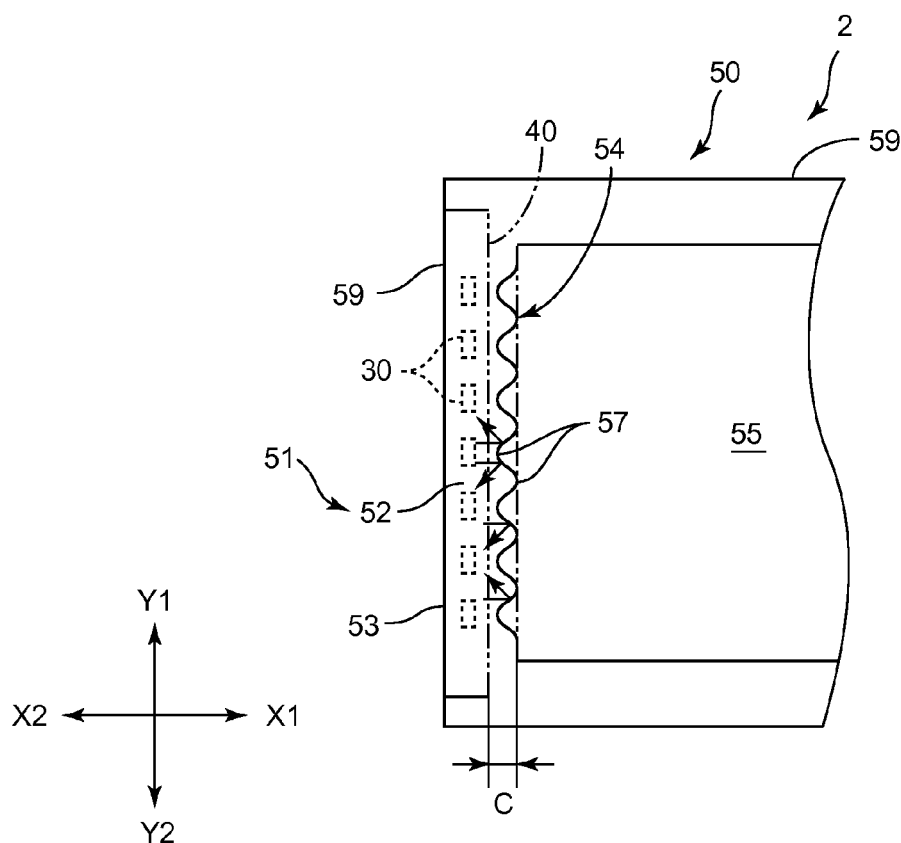
FIG. 4 is a partial plan view of a part of a diffusion plate according to a second embodiment of the present invention.

FIG. 4 is a partial plan view of a part of the diffusion plate 50 according to the second embodiment of the present invention. The diffusion plate 50 in FIG. 4 is viewed from the light incident surface 52 of the protruding part 51. A wave-shaped concave-convex 57 is formed in this embodiment on the internal side surface 54, which connects to the light incident area C of the protruding part 51, along the alignment direction of the plurality of LED light sources 30. In FIG. 4, the size of the wave-shaped concave-convex 57 is exaggerated. The pitch of the wave-shaped concave-convex 57, the alignment pitch of the LED light sources 30, and the depth (or height) of the concave-convex 57 can be set arbitrarily.

How light travels inside the protruding part 51 in the second embodiment is described next with reference to FIG. 2 and FIG. 4. Light emitted by the LED light sources 30 enters the interior of the light guiding plate 20 from the end surface 21 of the light guiding plate 20. A part of the light entering the light guiding plate 20 enters the light incident surface 52 of the protruding part 51 in the incident area C. A part of the light entering from the light incident surface 52 of the protruding part 51 travels while being reflected totally by the internal side surface 54 and the outer peripheral end surface 53 of the protruding part 51 and while being scattered by the light scattering particles to exit from the light exit surface of the diffusion plate 50, mainly a portion above where the protruding part 51 is disposed.

With the concave-convex 57 formed on the internal side surface 54 of the protruding part 51, light is diffused by the concave-convex 57 as indicated by the arrow in FIG. 4 and is readily reflected to the interior of the protruding part 51. This way, the diffusion plate 50 can be made bright along the peripheral edge portion despite the presence of the frame 40, and is prevented from being darker along the peripheral edge portion as though having a border. This makes the brightness even more uniform throughout the light exit surface of the diffusion plate 50.

Third Embodiment

An illumination module 3 according to a third embodiment of the present invention is described next with reference to FIG. 5 and FIG. 6. The illumination module 3 of the third embodiment includes, though not shown, the same components as those in the first embodiment which are, among others, the light guiding plate 20, the plurality of LED light sources 30 aligned along the end surface 21 of the light guiding plate 20, the frame 40 for supporting the LED light sources 30 and simultaneously blocking light that exits the peripheral edge portion 26 of the light guiding plate 20 that is on the left side, and the diffusion plate 50, which is overlaid on the light guiding plate 20. The illumination module 3 of the third embodiment differs from the first and second embodiments mainly in the structure of the diffusion plate 50. The description given here therefore focuses on the difference by comparing the third embodiment with the first embodiment. Components common to the first embodiment are denoted by the same reference symbols to omit or simplify descriptions thereof.

Figure 5:
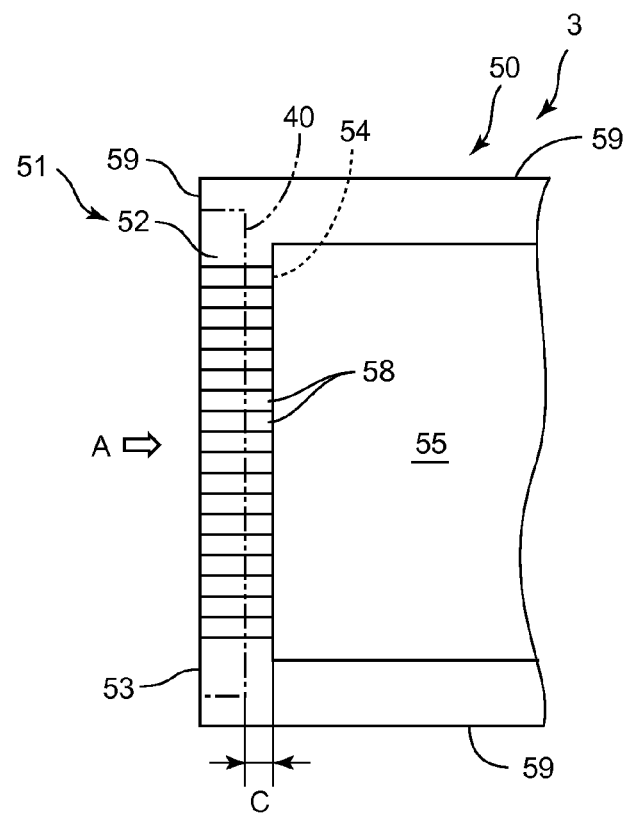
FIG. 5 is a partial plan view of a part of a diffusion plate according to a third embodiment of the present invention.

FIG. 5 is a partial plan view of a part of the diffusion plate 50 according to the third embodiment of the present invention. FIG. 6 is a side view of the diffusion plate 50 that is viewed from the direction of the arrow A. The diffusion plate 50 in FIG. 5 is viewed from the light incident surface 52 of the protruding part 51 (on the rear side). As illustrated in FIG. 5 and FIG. 6, the diffusion plate 50 of this embodiment has V-shaped grooves 58, which are formed on the light incident surface 52 of the protruding part 51, each stretching across the protruding part 51 (from the outer peripheral end surface 53 to the internal side surface 54). The V-shaped grooves 58 has the prism effect of light, and light emitted by the LED light sources 30 enters from the input area C of the light incident surface 52 of the protruding part 51 as illustrated in FIG. 6. A part of the incident light is diffused by the slopes of the V-shaped grooves 58 as indicated by the arrows in FIG. 6 before entering the interior of the protruding part 51, and then travels while being reflected totally between the outer peripheral end surface 53 and the internal side surface 54 of the protruding part 51 and while being scattered by the light scattering particles to exit from the light exit surface 56 of the diffusion plate 50, mainly a portion above where the protruding part 51 is disposed.

Light exiting the light guiding plate 20 is therefore diffused by the light incident surface 52 and then enters the interior of the protruding part 51. This prevents the light exit surface from having a dark border along a peripheral edge portion where the protruding part 51 is disposed by making the peripheral edge portion bright despite the presence of the light shielding portion 42 of the frame 40, and thus makes the brightness uniform throughout the light exit surface.

Figure 6:
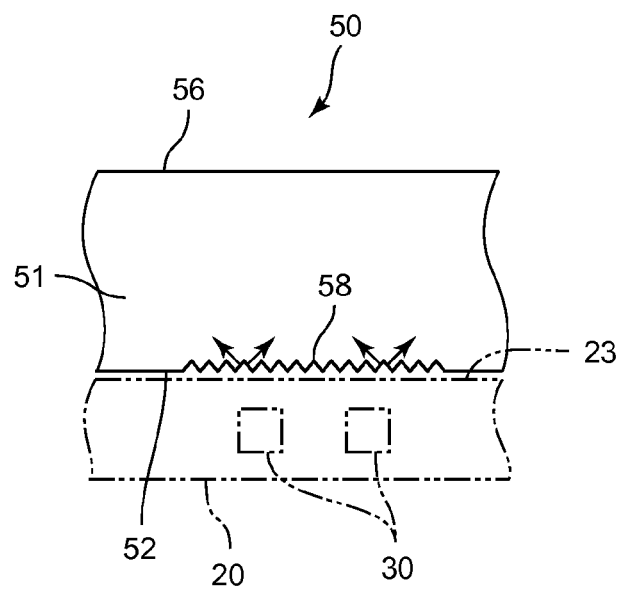
FIG. 6 is a side view of the diffusion plate according to the third embodiment of the present invention that is viewed from the direction of the arrow A.

The size of the V-shaped grooves 58 is exaggerated in FIG. 5 and FIG. 6. The position of the V-shaped grooves 58 relative to the LED light sources 30, and the depth and pitch of the V-shaped grooves 58 can be set arbitrarily as long as the V-shaped grooves 58 has the prism effect of light. Accordingly, what is called a prism sheet may be used as the V-shaped grooves 58.

While the V-shaped grooves 58 in FIG. 5 each stretch across the protruding part 51 from the outer peripheral end surface 53 to the internal side surface 54, the same effect is obtained when the V-shaped grooves 58 are formed within the confines of the light incident area C. Alternatively, the V-shaped grooves 58 may each run along the protruding part 51 (in the front side-back side direction).

Fourth Embodiment

An illumination module 4 according to a fourth embodiment of the present invention is described next with reference to FIG. 7. The illumination module 3 of the fourth embodiment includes the same components as those in the first embodiment which are, among others, the light guiding plate 20, the plurality of LED light sources 30 aligned along the end surface 21 of the light guiding plate 20, the frame 40 for supporting the LED light sources 30 and simultaneously blocking light that exits the peripheral edge portion 26 of the light guiding plate 20, and the diffusion plate 50, which is overlaid on the light guiding plate 20.

The illumination module 4 of the fourth embodiment differs from the first, second, and third embodiments mainly in the structure of the diffusion plate 50. Specifically, the diffusion plate 50 of the fourth embodiment uses in combination the wave-shaped concave-convex 57, which is formed in the protruding part 51 of the second embodiment, and the V-shaped grooves 58, which are formed in the protruding part 51 of the third embodiment. The description given here therefore focuses on the difference by comparing the fourth embodiment with the second and third embodiments. Components common to the second and third embodiments are denoted by the same reference symbols to omit or simplify descriptions thereof.

Figure 7:
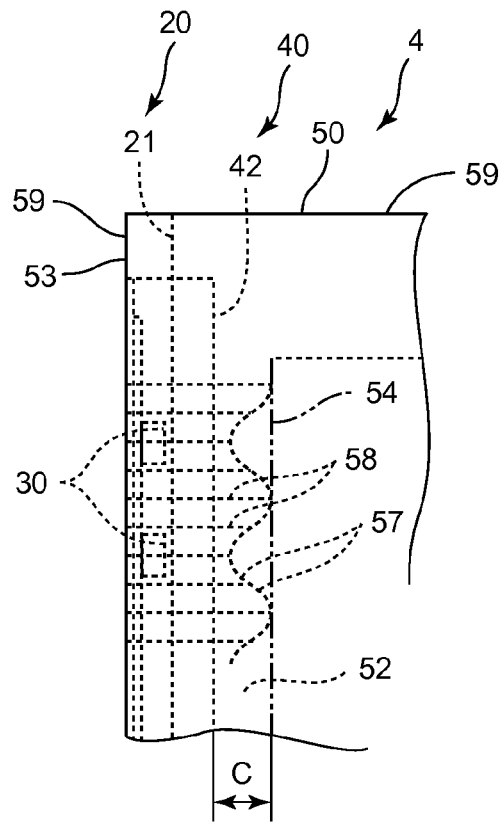
FIG. 7 is a partial plan view of apart of an illumination module according to a fourth embodiment of the present invention.

FIG. 7 is a partial plan view of apart of the illumination module 4 according to the fourth embodiment of the present invention. The diffusion plate 50 has the wave-shaped concave-convex 57, which is formed on the internal side surface 54 of the protruding part 51 to run along the alignment direction of the plurality of LED light sources 30 as described in the second embodiment, and the V-shaped grooves 58, which are formed on the light incident surface 52 of the protruding part 51, each stretching across the protruding part 51 (from the outer peripheral end surface 53 to the internal side surface 54), as described in the third embodiment.

In the thus structured illumination module 4, light is diffused by the concave-convex 57, which is formed on the internal side surface 54 of the protruding part 51, before entering the interior of the protruding part 51 as described in the second embodiment, and light that exits the light guiding plate 20 is diffused by the V-shaped grooves 58 before entering the interior of the protruding part 51 as described in the third embodiment. Combining the components of the first embodiment to the third embodiment in this manner makes the light exit surface bright at a peripheral edge portion where the protruding part 51 is disposed, to thereby prevent the diffusion plate 50 from being dark along the peripheral edge portion as though having a border despite the presence of the frame 40, and thus makes the brightness uniform throughout the light exit surface.

Fifth Embodiment

An illumination module 5 according to a fifth embodiment of the present invention is described next with reference to FIG. 8 and FIG. 9. The illumination module 5 of the fifth embodiment differs from the first embodiment mainly in the structure of the light guiding plate 20. The description given here therefore focuses on the difference by comparing the fifth embodiment with the first embodiment. Components common to the fifth embodiment and the first embodiment are denoted by the same reference symbols to omit or simplify descriptions thereof.

Figure 8:
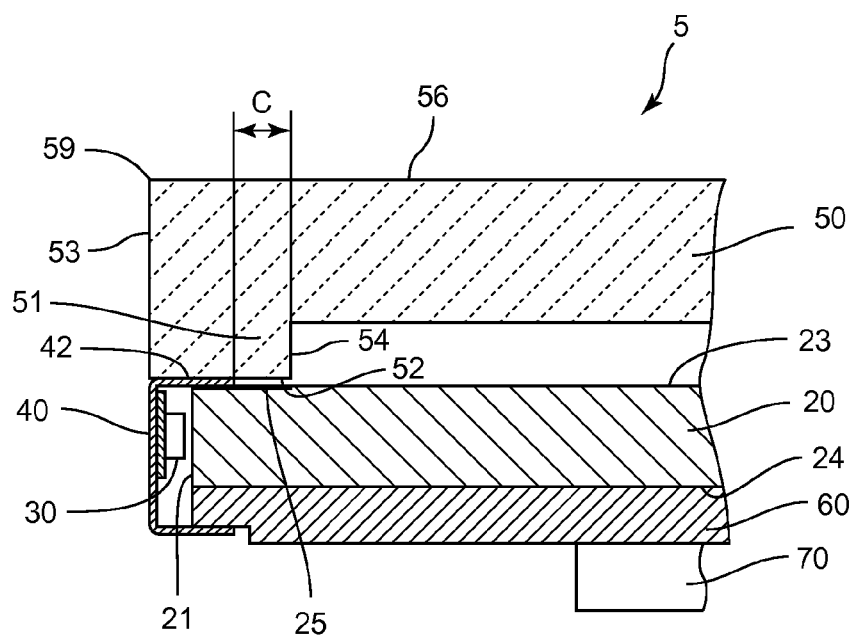
FIG. 8 is a partial sectional and end view of a part of an illumination module according to a fifth embodiment of the present invention.

FIG. 8 is a partial sectional and end view of a part of the illumination module 5 according to the fifth embodiment of the present invention. FIG. 9 is a partial plan view of a part of the light guiding plate 20 according to the fifth embodiment of the present invention. The illumination module 5 of the fifth embodiment includes, as illustrated in FIG. 8, the same components as those in the first embodiment which are, among others, the light guiding plate 20, the plurality of LED light sources 30 aligned along the end surface 21 of the light guiding plate 20, the frame 40 for supporting the LED light sources 30 and simultaneously blocking light that exits the peripheral edge portion 26 of the light guiding plate 20, and the diffusion plate 50, which is overlaid on the light guiding plate 20.

The light guiding plate 20 has diffusion surfaces 25 formed on the first principal surface 23, which faces the light incident surface 52 of the protruding part 51. The diffusion surfaces 25 are, for example, surfaces with minute dot-patterned concaves and convexes which are formed by performing surface roughening treatment at given points on the first principal surface 23. As illustrated in FIG. 9, the diffusion surfaces 25 are each formed between the LED light sources 30 that are adjacent to each other. The diffusion surfaces 25 are formed in a stretch between the end surface 21 into which light from the LED light sources 30 enters and points where a vertical line dropped from the internal side surface 54 intersects the first principal surface 23. Each diffusion surface 25 is shaped like a triangle the base of which is on the end surface 21 side.

In the case where the diffusion surfaces 25 are not formed in the light guiding plate 20, the light guiding plate 20 is bright in a portion nearest to the light emitting direction of the LED light sources 30, and is dark in a peripheral portion off the light emitting direction (for example, an area between the LED light sources 30 that are adjacent to each other). With the diffusion surfaces 25 formed at peripheral points that are dark, light is diffused in a stretch where the diffusion surfaces 25 are formed and the peripheral points become brighter than the surroundings. The difference in brightness between a portion nearest to the light emitting direction of the LED light sources 30 and a peripheral portion thereof is accordingly reduced on the first principal surface 23, which is a light exit surface. This and providing the protruding part 51 have a synergistic effect on preventing the diffusion plate 50 from being darker along a peripheral edge portion as though having a border, and thus make the brightness uniform throughout the light exit surface including the peripheral edge portion of the diffusion plate 50. Light diffused by the diffusion surfaces 25 is mainly light emitted by the LED light sources 30 that are aligned along the end surface 22. Specifically, a part of light emitted by the LED light sources 30 that are aligned along the end surface 22 and traveling toward the end surface 21 is diffused by the diffusion surfaces 25, thus reducing the difference in brightness between a portion nearest to the light emitting direction of the LED light sources 30 and a peripheral portion thereof.

Figure 9:
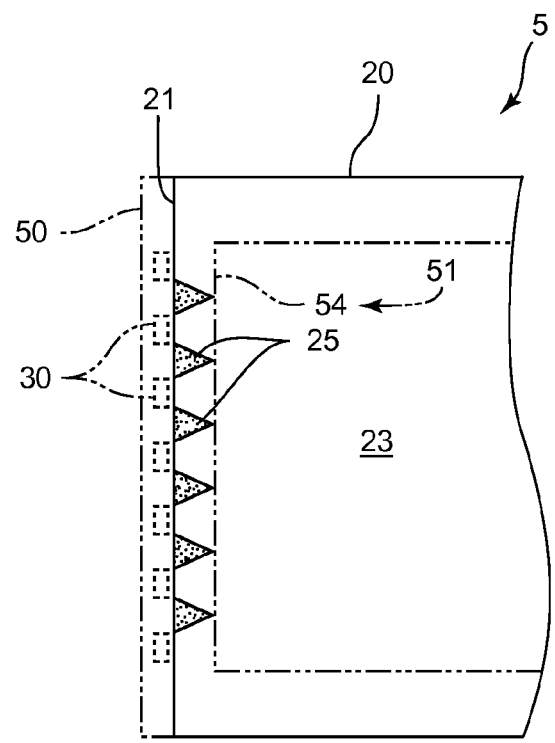
FIG. 9 is a partial plan view of a part of a light guiding plate according to the fifth embodiment of the present invention.

The shape of each diffusion surface 25 in the plan view is triangular as illustrated in FIG. 9. Light emitted by the LED light sources 30 becomes darker as the distance from the LED light sources 30 grows, and reaches to a certain point where the difference between the brightness of the light and the brightness of the surroundings is small. It is therefore preferred in making light uniform to decrease the areal dimensions of each diffusion surface with an increase in distance from the LED light sources 30. As long as this is accomplished, the shape of each diffusion surface 25 does not always need to be triangular.

Figure 10:
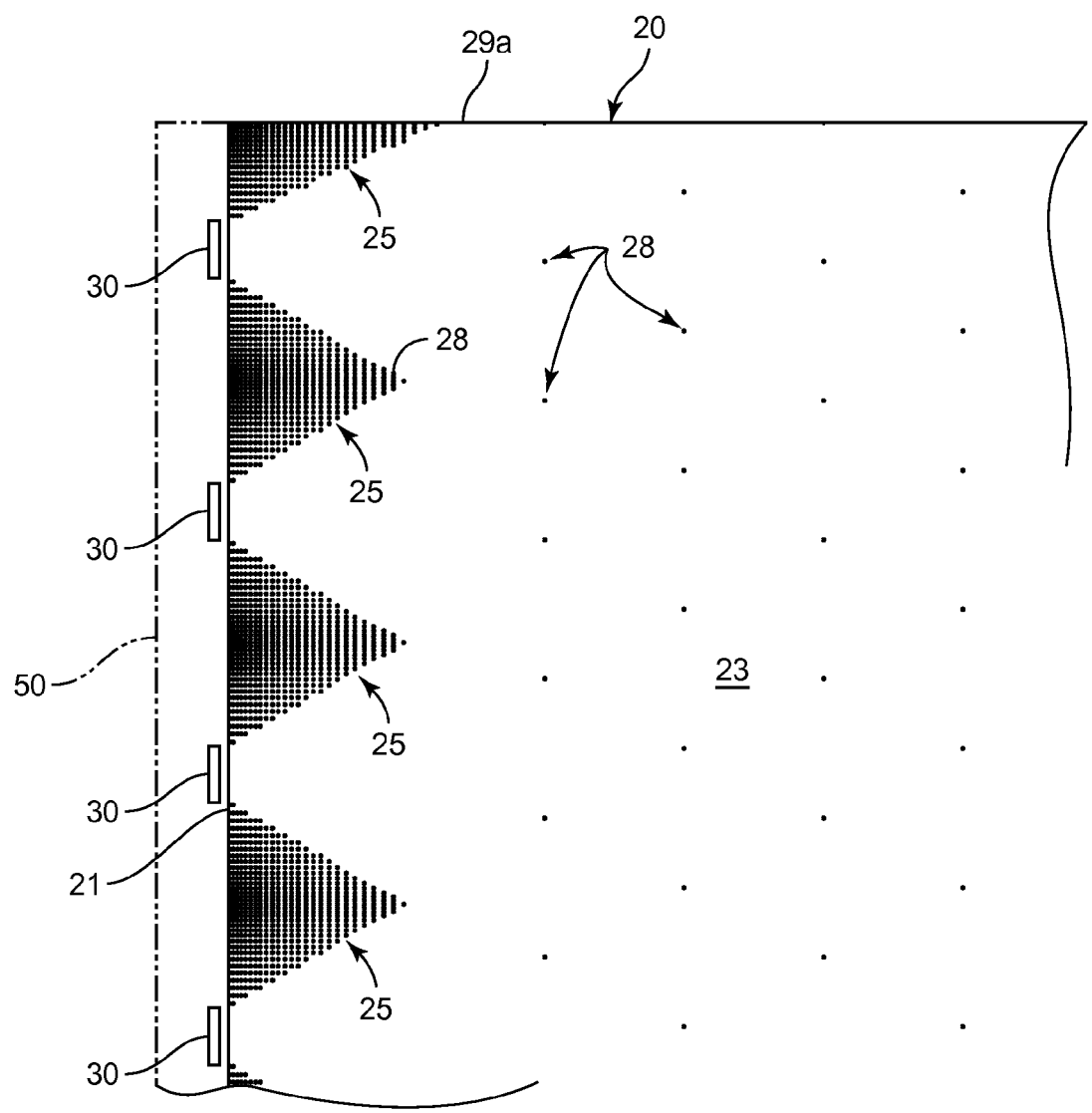
FIG. 10 is a partial plan view of a light guiding plate according to another Example of the fifth embodiment of the present invention.

The diffusion surfaces 25 formed in the light guiding plate 20 of the fifth embodiment described above are surfaces with minute concaves and convexes formed by surface roughening treatment. Instead of surfaces with minute concaves and convexes formed by surface roughening treatment, the diffusion surfaces 25 can be, for example, a plurality of minute, lens-shaped concaves and convexes and still can make the brightness uniform on the first principal surface 23, which is a light exit surface of the light guiding plate 20. This is described through Example. FIG. 10 is a partial plan view of the light guiding plate 20 according to another Example of the fifth embodiment. The diffusion surfaces 25 are formed in the light guiding plate 20. The diffusion surfaces 25 are formed on the first principal surface 23, which faces the light incident surface 52 of the protruding part 51 of the diffusion plate 50 (see FIG. 8 and FIG. 9). Every one of dots illustrated in FIG. 10 is a minute concave/convex having a convex lens shape, a concave lens shape, or a conical shape. The concave/convex in the following description is a convex 28 having the shape of a convex lens.

The diffusion surfaces 25 are each formed between the LED light sources 30 that are adjacent to each other. A stretch where the diffusion surfaces 25 are formed is practically the same as in the fifth embodiment (see FIG. 9), except that the diffusion surfaces 25 in this example are formed also on the sides where the LED light sources 30 are not disposed, namely, an end surface 29a side (see FIG. 10) and an end surface 29b side (not shown) opposite from the end surface 29a. As illustrated in FIG. 10, an aggregation of the convexes 28 on a single diffusion surface 25 is arranged so as to be denser as the distance to the end surface 21 along which the LED light sources 30 are aligned closes at a midpoint between the adjacent LED light sources 30. The convexes 28 are provided densely at a midpoint between one LED light source 30 and another which is distant from the LED light sources 30 and is accordingly dark. The aggregation of the convexes 28 is also arranged so as to be sparser as the distance from the midpoint described above, or from the end surface 21, grows.

Though not shown, V-shaped grooves may be formed instead of concaves or convexes each having a convex lens shape, a concave lens shape, or a conical shape. The V-shaped groove can have, for example, the same shape as that of the V-shaped grooves 58 of FIG. 6 to have the prism effect. The V-shaped grooves here, however, are arranged so as to spread radially from the point where the convexes 28 are gathered most densely within the confines of each diffusion surface 25 illustrated in FIG. 10.

According to Example described above, the diffusion surfaces 25 are provided which are each an aggregation of concaves or convexes having a convex lens shape, a concave lens shape, or a conical shape, or an aggregation of V-shaped grooves. Each of those aggregations is arranged so that the convexes, concaves, or grooves become denser as the distance to the end surface 21 along which the LED light sources 30 are aligned closes at a midpoint between the LED light sources 30 that are adjacent to each other, and become sparser as the distance from the midpoint or the end surface 21 grows. This reduces the decrease in brightness at a point between the LED light sources 30 which is dark and a point near an edge where no LED light sources 30 are disposed, thereby making the brightness uniform on the first principal surface 23, which is a light exit surface of the light guiding plate 20.

In addition, the convexes 28 (having a convex lens shape, a concave lens shape, a conical shape, or the like) also dot the central portion (a large area that does not have the diffusion surfaces 25) of the first principal surface 23 of the light guiding plate 20 as illustrated in FIG. 10. Dotting the central portion with the convexes 28 prevents color unevenness. Alternatively, the number of convexes 28 disposed between the LED light sources 30 that are adjacent to each other may be 1.

Sixth Embodiment

An illumination module 6 according to a sixth embodiment of the present invention is described next with reference to FIG. 11. The illumination module 6 of the sixth embodiment differs from the first embodiment mainly in the structure of the diffusion plate 50 and the light guiding plate 20. Specifically, the illumination module 6 of the sixth embodiment combines the diffusion plate 50 of the second embodiment (see FIG. 4) with the light guiding plate 20 of the fifth embodiment (see FIG. 8, FIG. 9, or FIG. 10). The description given here therefore focuses on the difference by comparing the sixth embodiment with the second and fifth embodiments. Components common to the sixth embodiment and the second and fifth embodiments and components functionally similar between the sixth embodiment and the second and fifth embodiments are denoted by the same reference symbols to omit or simplify descriptions thereof.

Figure 11:
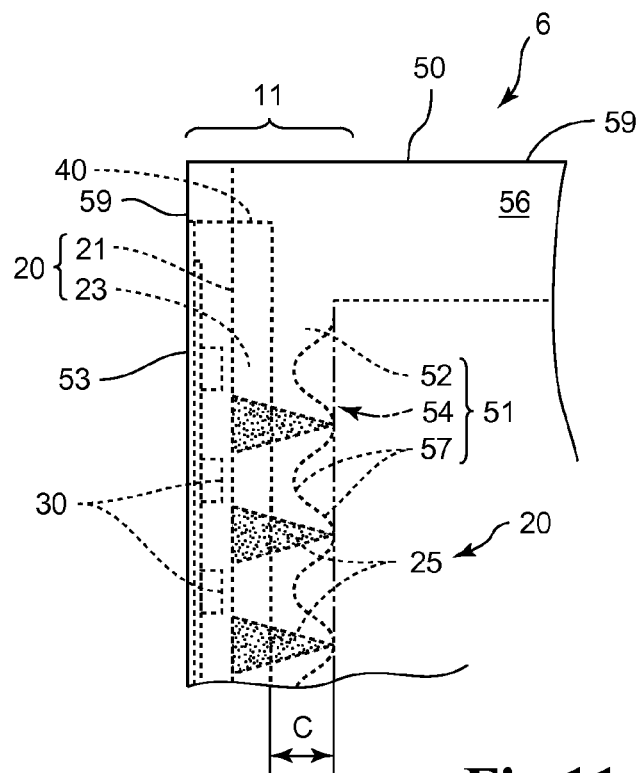
FIG. 11 is a partial plan view of a part of a first light source portion on the left side of an illumination module according to a sixth embodiment of the present invention.

FIG. 11 is a partial plan view of a part of a first light source portion on the left side of the illumination module 6 according to the sixth embodiment of the present invention. The illumination module 6 includes the same components as those in the first embodiment which are, among others, the light guiding plate 20, the plurality of LED light sources 30 aligned along the end surface 21 of the light guiding plate 20, the frame 40 for supporting the LED light sources 30 and simultaneously blocking light that exits the peripheral edge portion 26 of the light guiding plate 20, and the diffusion plate 50, which is overlaid on the light guiding plate 20.

The light guiding plate 20 has diffusion surfaces 25 formed on the first principal surface 23, which faces the light incident surface 52 of the protruding part 51, as in the fifth embodiment. The diffusion surfaces 25 are, for example, surfaces with minute dot-patterned concaves and convexes which are formed by performing surface roughening treatment at given points on the first principal surface 23. As illustrated in FIG. 11, the diffusion surfaces 25 are each formed between the LED light sources 30 that are adjacent to each other. The diffusion surfaces 25 are formed in a stretch between the end surface 21 into which light from the LED light sources 30 enters and points where a vertical line dropped from the internal side surface 54 intersects the first principal surface 23. Each diffusion surface 25 is shaped like a triangle the base of which is on the end surface 21 side.

The diffusion plate 50 has, as in the second embodiment, the wave-shaped concave-convex 57 on the internal side surface 54 of the protruding part 51, which runs along the alignment direction of the plurality of LED light sources 30.

The illumination module 6 of the sixth embodiment reduces the difference in brightness between a portion nearest to the light emitting direction of the LED light sources 30 and a peripheral portion thereof on the first principal surface 23, which is a light exit surface, by forming the diffusion surfaces 25 on the first principal surface 23 of the light guiding plate 20. The illumination module 6 also has the wave-shaped concave-convex 57, which is formed on the internal side surface 54 of the protruding part 51 and which diffuses light entering from the first principal surface 23 of the light guiding plate 20, to thereby brighten a peripheral edge portion of the diffusion plate 50 where the protruding part 51 is disposed. Providing the diffusion surfaces 25 on the first principal surface 23 of the light guiding plate 20 and providing the wave-shaped concave-convex 57 on the internal side surface 54 of the diffusion plate 50 in this manner have a synergistic effect on preventing the diffusion plate 50 from being darker along a peripheral edge portion as though having a border, and thus make the brightness uniform throughout the light exit surface including the peripheral edge portion of the diffusion plate 50.

Seventh Embodiment

An illumination module 7 according to a seventh embodiment of the present invention is described next with reference to FIG. 12. The illumination module 7 of the seventh embodiment differs from the first embodiment mainly in the structure of the diffusion plate 50 and the light guiding plate 20. Specifically, the illumination module 7 of the seventh embodiment combines the diffusion plate 50 of the third embodiment (see FIG. 4 and FIG. 5) with the light guiding plate 20 of the fifth embodiment (see FIG. 7 and FIG. 8). The description given here therefore focuses on the difference by comparing the seventh embodiment with the third and fifth embodiments. Components common to the seventh embodiment and the third and fifth embodiments and components functionally similar between the seventh embodiment and the third and fifth embodiments are denoted by the same reference symbols to omit or simplify descriptions thereof.

Figure 12:
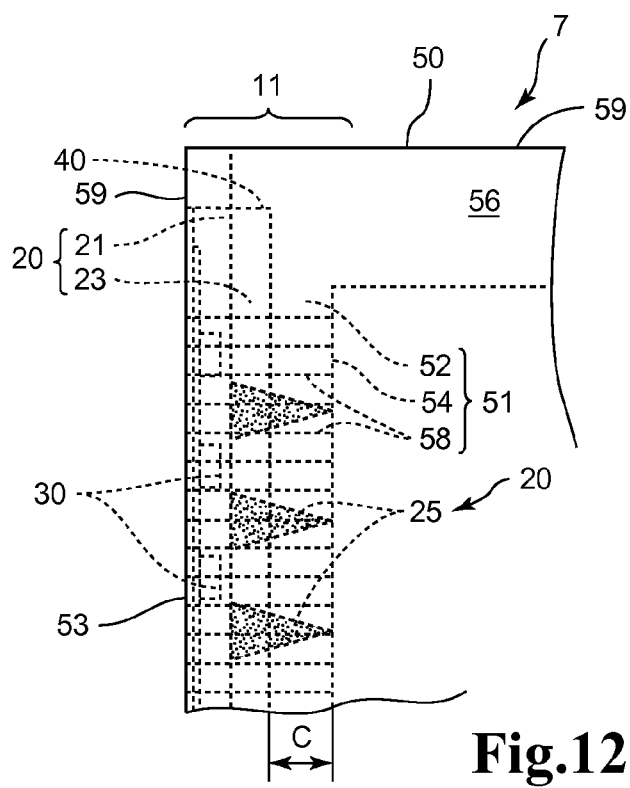
FIG. 12 is a partial plan view of a part of a first light source portion on the left side of an illumination module according to a seventh embodiment of the present invention.

FIG. 12 is a partial plan view of a part of a first light source portion 11 on the left side of the illumination module 7 according to the seventh embodiment of the present invention. The illumination module 7 includes the same components as those in the first embodiment which are, among others, the light guiding plate 20, the plurality of LED light sources 30 aligned along the end surface 21 of the light guiding plate 20, the frame 40 for supporting the LED light sources 30 and simultaneously blocking light that exits the peripheral edge portion 26 of the light guiding plate 20, and the diffusion plate 50, which is overlaid on the light guiding plate 20.

The light guiding plate 20 has diffusion surfaces 25 formed on the first principal surface 23, which faces the light incident surface 52 of the protruding part 51, as in the fifth embodiment. The diffusion surfaces 25 are, for example, surfaces with minute dot-patterned concaves and convexes which are formed by performing surface roughening treatment at given points on the first principal surface 23. As illustrated in FIG. 12, the diffusion surfaces 25 are each formed between the LED light sources 30 that are adjacent to each other. The diffusion surfaces 25 are formed in a stretch between the end surface 21 into which light from the LED light sources 30 enters and points where a vertical line dropped from the internal side surface 54 intersects the first principal surface 23. Each diffusion surface 25 is shaped like a triangle the base of which is on the end surface 21 side.

The diffusion plate 50 has, as in the fifth embodiment, V-shaped grooves 58, which are formed on the light incident surface 52 of the protruding part 51, each stretching across the protruding part 51 (from the outer peripheral end surface 53 to the internal side surface 54).

The illumination module 7 of the seventh embodiment reduces the difference in brightness between a portion nearest to the light emitting direction of the LED light sources 30 and a peripheral portion thereof on the first principal surface 23 by forming the diffusion surfaces 25 between the LED light sources 30 that are adjacent to each other on the first principal surface 23 of the light guiding plate 20. The illumination module 7 also has the V-shaped grooves 58, which is formed on the light incident surface 52 of the protruding part 51 of the diffusion plate 50 and which diffuses, by the prism effect of the V-shaped grooves 58, light entering from the first principal surface 23 of the light guiding plate 20, to thereby brighten a peripheral edge portion of the diffusion plate 50. Providing the diffusion surfaces 25 on the first principal surface 23 of the light guiding plate 20 and providing the V-shaped grooves 58 on the light incident surface 52 of the protruding part 51 of the diffusion plate 50 therefore have a synergistic effect on preventing the diffusion plate 50 from being darker along a peripheral edge portion as though having a border, and thus make the brightness uniform throughout the light exit surface including the peripheral edge portion of the diffusion plate 50.

Eighth Embodiment

An illumination module 8 according to an eighth embodiment of the present invention is described next with reference to FIG. 13. The illumination module 8 of the eighth embodiment differs from the first embodiment mainly in the structure of the diffusion plate 50 and the light guiding plate 20. Specifically, the illumination module 8 of the eighth embodiment combines the diffusion plate 50 of the fourth embodiment (see FIG. 7) with the light guiding plate 20 of the fifth embodiment (see FIG. 8, FIG. 9, or FIG. 10). The description given here therefore focuses on the difference by comparing the eighth embodiment with the fourth and fifth embodiments. Components common to the eighth embodiment and the fourth and fifth embodiments and components functionally similar between the eighth embodiment and the fourth and fifth embodiments are denoted by the same reference symbols to omit or simplify descriptions thereof.

Figure 13:
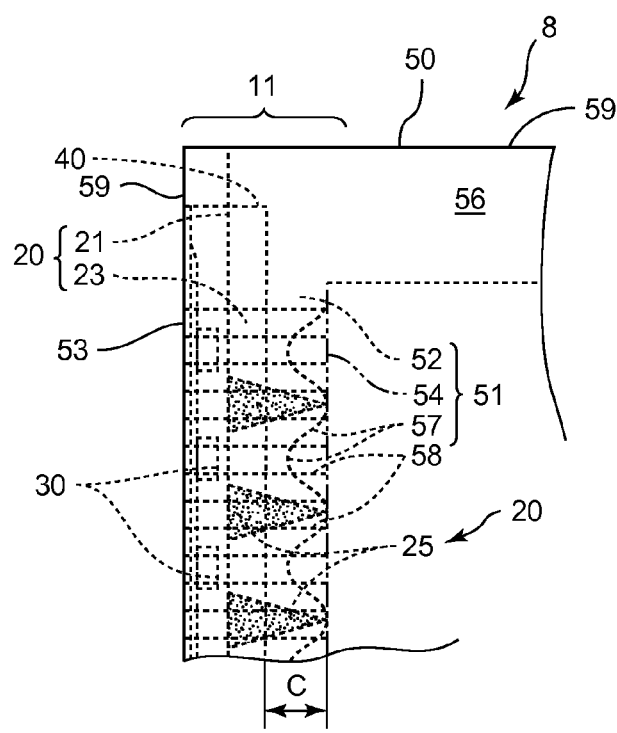
FIG. 13 is a partial plan view of a part of a first light source portion on the left side of an illumination module according to an eighth embodiment of the present invention.

FIG. 13 is a partial plan view of a part of a first light source portion 11 on the left side of the illumination module 8 according to the eighth embodiment of the present invention. The illumination module 8 includes the same components as those in the first embodiment which are, among others, the light guiding plate 20, the plurality of LED light sources 30 aligned along the end surface 21 of the light guiding plate 20, the frame 40 for supporting the LED light sources 30 and simultaneously blocking light that exits the peripheral edge portion 26 of the light guiding plate 20, and the diffusion plate 50, which is overlaid on the light guiding plate 20.

The light guiding plate 20 has diffusion surfaces 25 formed on the first principal surface 23, which faces the light incident surface 52 of the protruding part 51, as in the fifth embodiment. The diffusion surfaces 25 are, for example, surfaces with minute dot-patterned concaves and convexes which are formed by performing surface roughening treatment at given points on the first principal surface 23. As illustrated in FIG. 13, the diffusion surfaces 25 are each formed between the LED light sources 30 that are adjacent to each other. The diffusion surfaces 25 are formed in a stretch between the end surface 21 into which light from the LED light sources 30 enters and points where a vertical line dropped from the internal side surface 54 intersects the first principal surface 23. Each diffusion surface 25 is shaped like a triangle the base of which is on the end surface 21 side.

The diffusion plate 50 uses in combination the wave-shaped concave-convex 57, which is formed in the protruding part 51 of the second embodiment, and the V-shaped grooves 58, which are formed in the protruding part 51 of the third embodiment. The wave-shaped concave-convex 57 is formed on the internal side surface 54 of the protruding part 51 to run along the alignment direction of the plurality of LED light sources 30. The V-shaped grooves 58 are formed on the light incident surface 52 of the protruding part 51, each stretching across the protruding part 51 (from the outer peripheral end surface 53 to the internal side surface 54).

The illumination module 8 of the eighth embodiment reduces the difference in brightness between a portion nearest to the light emitting direction of the LED light sources 30 and a peripheral portion thereof on the first principal surface 23, which is a light exit surface, by forming the diffusion surfaces 25 between the LED light sources 30 that are adjacent to each other on the first principal surface 23 of the light guiding plate 20.

In addition, with the wave-shaped concave-convex 57 formed on the internal side surface 54 of the protruding part 51 of the diffusion plate 50, light is diffused by the concave-convex 57 and then reflected to the interior of the protruding part 51, thus brightening a peripheral edge portion of the diffusion plate 50.

Further, with the V-shaped grooves 58 formed on the light incident surface 52 of the protruding part 51, light exiting the light guiding plate 20 is diffused by the light incident surface 52 of the protruding part 51, thus brightening a peripheral edge portion of the diffusion plate 50 where the protruding part 51 is disposed.

Providing the diffusion surfaces 25 on the first principal surface 23 of the light guiding plate 20 and providing the wave-shaped concave-convex 57 and the V-shaped grooves 58 in the protruding part 51 of the diffusion plate 50 therefore have a synergistic effect on preventing the diffusion plate 50 from being dark along a peripheral edge portion as though having a border, and thus make the brightness uniform throughout the light exit surface including the peripheral edge portion of the diffusion plate 50.

Ninth Embodiment

Figure 14:
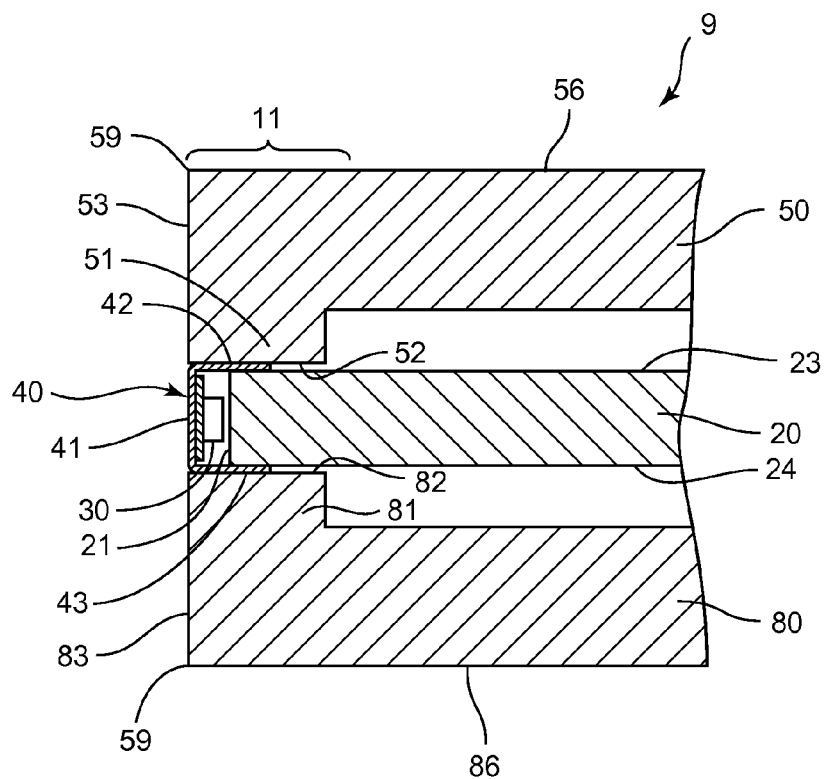
FIG. 14 is a partial sectional and end view of a first light source portion on the left side of an illumination module according to a ninth embodiment of the present invention.

An illumination module 9 according to a ninth embodiment of the present invention is described next with reference to FIG. 14. The ninth embodiment is an application example of the first embodiment to the eighth embodiment described above, and differs from the preceding embodiments in that a diffusion plate 80 is provided on the rear side of the light guiding plate 20 in addition to the diffusion plate 50 to allow light to exit from the front surface and the rear surface (upward and downward) both. The description given here therefore focuses on the difference. Components common to the ninth embodiment and the first embodiment are denoted by the same reference symbols to omit or simplify descriptions thereof. While the protruding part 51 in the illumination module 1 according to this ninth embodiment is formed along the entire outer periphery (four sides) of the diffusion plate 50, the protruding part 51 may be formed in each of a left peripheral edge portion and a right peripheral edge portion among the peripheral edge portions of the diffusion plate 50 which are on the sides where the LED light sources 30 are disposed, FIG. 14 is a partial sectional and end view of a first light source portion 11 on the left side of the illumination module 9 according to the ninth embodiment. The illumination module 9 includes, among others, the light guiding plate 20, the plurality of LED light sources 30 aligned along the left end surface 21 of the light guiding plate 20, the frame 40 for supporting the LED light sources 30 and simultaneously blocking light that exits the peripheral edge portion 26 of the light guiding plate 20 that is on the left side, the diffusion plate 50 disposed on the first principal surface 23 side of the light guiding plate 20, and the diffusion plate 80 disposed on the second principal surface 24 side. The diffusion plate 50 and the diffusion plate 80 can share specifications.

The light guiding plate 20 has, as in the first embodiment, the left end surface 21 and the right end surface 22 (see FIG. 1) into which light emitted by the LED light sources 30 enters, the first principal surface 23, which faces the diffusion plate 50, and the second principal surface 24, which faces the first principal surface 23. As in the first embodiment (see FIG. 1), the plurality of LED light sources 30 are aligned along the left end surface 21 of the light guiding plate 20 at approximately regular intervals, and another set of the plurality of LED light sources 30 is aligned along the right end surface 22 of the light guiding plate 20 at approximately regular intervals. The LED light sources 30 are each placed at or close to the center in the thickness direction of the light guiding plate 20.

The frame 40 includes the base portion 41, which runs along the left end surface 21, the light shielding portion 42, which extends from the base portion 41 to the first principal surface 23 of the light guiding plate 20, and the light shielding portion 43, which extends to the second principal surface 24. The right side of the frame 40 is structured the same and a description thereof is omitted. The light shielding portion 42 blocks light that is emitted by the LED light sources 30 from directly entering the diffusion plate 50. The light shielding portion 43 blocks light that is emitted by the LED light sources 30 from directly entering the diffusion plate 80.

The protruding part 51, which protrudes toward the first principal surface 23 of the light guiding plate 20, is formed at a peripheral edge portion of the diffusion plate 50 on the side where the LED light sources 30 are disposed. A protruding part 81, which protrudes toward the second principal surface 24 of the light guiding plate 20, is formed at a peripheral edge portion of the diffusion plate 80 on the side where the LED light sources 30 are disposed. A bottom surface of the protruding part 51 and a bottom surface of the protruding part 81 are the light incident surface 52 and a light incident surface 82, respectively, into which light exiting the light guiding plate 20 enters. The second principal surface 24, which is a surface of the light guiding plate 20 on the side opposite from the diffusion plate 50, functions as a first exit surface. A surface of the diffusion plate 80 on the side opposite from the light guiding plate 20 is a light exit surface 86. The light incident surface 82 functions as a first light incident surface, and the light exit surface 86 functions as a second light exit surface.

The illumination module 9 of the ninth embodiment has the diffusion plate 50 on the side where the first principal surface 23 of the light guiding plate 20 is disposed and also has the diffusion plate 80 on the side where the second principal surface 24 of the light guiding plate 20 is disposed. The light guiding plate 20 and the diffusion plate 50 in any of the first embodiment to the eighth embodiment described above are therefore applicable to the illumination module 9 of the ninth embodiment.

The thus described illumination module 9 in the ninth embodiment is capable of emitting light from the front surface and the rear surface both, and, in addition, can adopt the structures of the first embodiment to the eighth embodiment for the light exit surfaces 56 and 86, which means that the brightness is made uniform on the light exit surface of each of the diffusion plate 50 and the diffusion plate 80 including a peripheral edge portion of the diffusion plate by avoiding giving the diffusion plate a dark border along the peripheral edge portion.

The embodiments described above give an example in which the outer peripheral end surface 53 and the internal side surface 54 are parallel to each other. However, the outer peripheral end surface 53 and the internal side surface 54 do not need to be disposed so as to be parallel to each other. Changing the angle of the outer peripheral end surface 53 or the internal side surface 54 with respect to the first principal surface 23 changes the amount of light that is reflected totally by the outer peripheral end surface 53 or the internal side surface 54, and the direction of the total reflection. Placing the light incident surface 52 parallel to, or at an angle (non-parallel) to, the first principal surface 23 changes the amount of light that enters the light incident surface 52 from the first principal surface 23.

While an individual illumination module is described in the first to eighth embodiments of the present invention, the present invention is also effective for a large-sized LED illumination device that is built from a plurality of illumination modules placed side by side. This is described with reference to FIG. 15 and FIG. 16A to FIG. 16C.

(Panel-Type Illumination Device)

Figure 15:
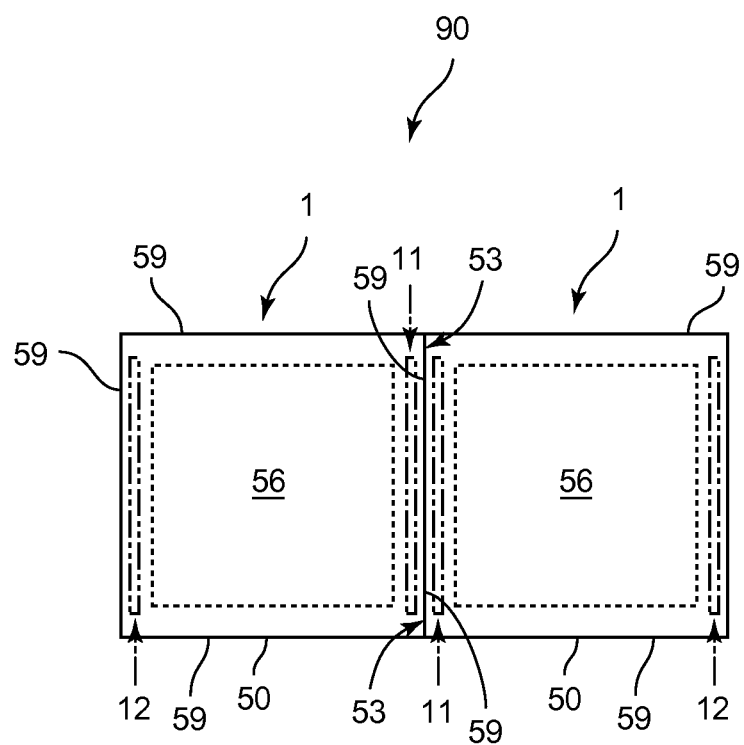
FIG. 15 is a plan view for illustrating an example of a panel-type illumination device in which two of illumination modules of the present invention are disposed side by side.

FIG. 15 is a plan view of an example of a panel-type illumination device 90 in which two illumination modules of the present invention are placed side by side. As illustrated in FIG. 15, the panel-type illumination device 90 puts the outer peripheral end surface 53 of the diffusion plate 50 in the first light source portion 11 of one illumination module 1 in close contact to the outer peripheral end surface 53 of another illumination module 1.

As described above, each of the individual illumination modules 1-9 does not allow a light exit surface to be dark along a peripheral edge portion as though having a border, thereby making the brightness uniform throughout the light exit surface including the peripheral edge portion. Accordingly, when two illumination modules 1 are placed side by side, the joint between the two does not appear as a border, and the panel-type illumination device 90 that is large in size and has an excellent appearance is realized.

As illustrated in FIG. 2 and other drawings, the outer peripheral end surface 53, which is an outer peripheral side surface on the side where the protruding part 51 of the diffusion plate 50 is provided, and the external side surface 44 of the base portion 41 of the frame 40 are placed in the same plane. In other words, an outer peripheral edge 59, which is an edge along the outer periphery of the light exit surface 56, is placed in the same plane as the external side surface 44. This makes the gap small between the light exit surfaces 56 that are placed side by side in the side-by-side illumination modules 1, and the resultant panel-type illumination device 90 is large in size without a noticeable gap between the side-by-side light exit surfaces 56, which form a continuous chain.

How the illumination modules 1 are aligned in the panel-type illumination device 90 is not limited. For example, three or more illumination modules 1 may be aligned and the alignment direction is not particularly limited as well. For example, the illumination modules 1 may be aligned by putting the first light source portion 11 of one illumination module 1 in close contact with the second light source portion 12 of another illumination module, or putting the first light source portion 11 or second light source portion 12 of one illumination module in close contact with a different side of another illumination module 1.

When placing a plurality of individual illumination modules side by side, the outer peripheral edge 59 of the diffusion plate 50 of one illumination module is put into close contact with the outer peripheral edge 59 of another illumination module by making the outer peripheral edge 59 along each of the four sides of the diffusion plate 50 flush with the external side surface 44 of the frame 40 and the outer peripheral end surface 27 of the light guiding plate 20, or by making the outer peripheral edge 59 protrude farther than the external side surface 44 and the outer peripheral end surface 27. This eliminates a gap between the adjacent diffusion plates 50 and prevents each diffusion plate 50 from being dark along a peripheral edge portion as though having a border, thereby realizing the panel-type illumination device 90 that is uniform in brightness throughout each light exit surface 56.

Figure 16A:
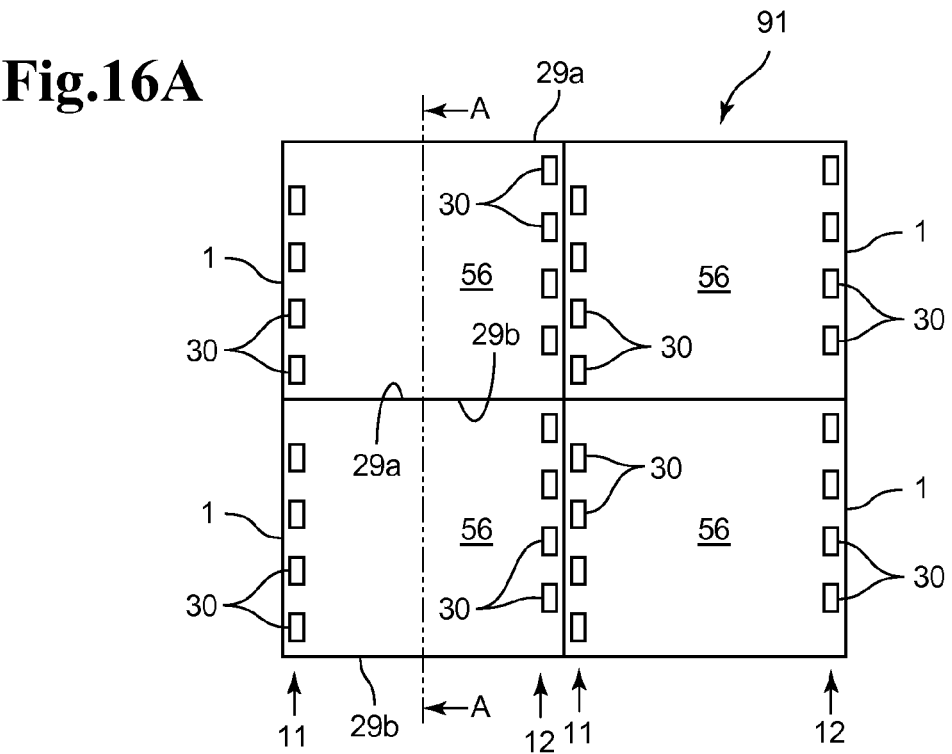
FIG. 16A to FIG. 16C are diagrams of a panel-type illumination device in which four of the illumination module of the present invention are arranged so that two are placed side by side across and so that the other two are placed side by side down, with FIG. 16A at the top being a light source arrangement diagram, FIG. 16B in the middle being a brightness distribution diagram of a single illumination module, and FIG. 16C at the bottom being a brightness distribution diagram of two illumination modules disposed side by side.
Figure 16B:
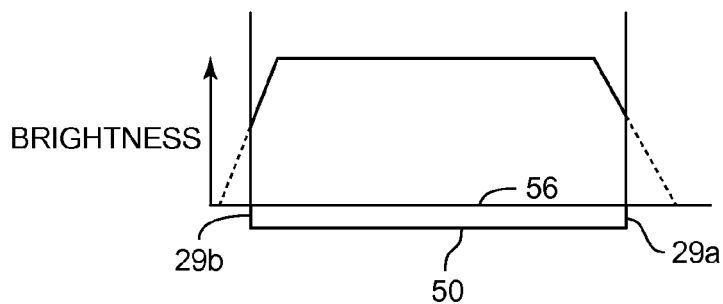
Figure 16C:
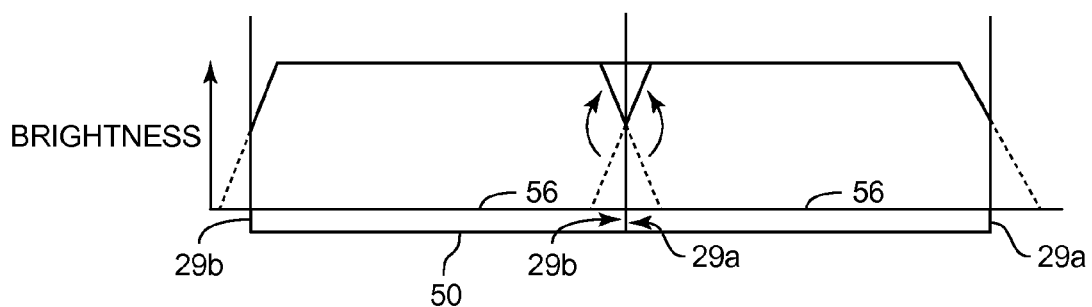

FIG. 16A to FIG. 16C are diagrams of a panel-type illumination device 91 in which four of the illumination module of the present invention are arranged so that two are placed side by side across and so that the other two are placed side by side down, with FIG. 16A at the top being a light source arrangement diagram, FIG. 16B in the middle being a brightness distribution diagram of a single illumination module, and FIG. 16C at the bottom being a brightness distribution diagram of two illumination modules disposed side by side. FIG. 16B and FIG. 16C are schematic views viewed in the A-A direction in FIG. 16A. Namely, FIG. 16B and FIG. 16C are viewed from the direction of the arrow A of FIG. 16A. As illustrated in FIG. 16A, the panel-type illumination device 91 has two illumination modules 1 placed side by side across and two illumination modules placed side by side down, four, in total. In the lateral direction of the panel-type illumination device 91, opposing end surfaces of the second light source portion 12 on the right side of one illumination module 1 and the first light source portion 11 on the left side of another illumination module 1 are put in close contact with each other. In the longitudinal direction of the panel-type illumination device 91, the end surface 29a of the light guiding plate 20 of one illumination module 1 and the end surface 29b of the light guiding plate 20 of another illumination module 1 which are on the sides where the LED light sources 30 are not disposed are put in close contact with each other.

The brightness distribution of the illumination modules 1 is described next. As illustrated in FIG. 16B, which is the brightness distribution of a single illumination module 1, light leaks from the end surface 29a or the end surface 29b at a point in the diffusion plate 50 that is close to one of the end surface 29a and the end surface 29b, which are on the sides where the LED light sources 30 are not disposed, and the light at the point is not emitted from the light exit surface 56. A point on the light exit surface 56 that is close to one of the end surface 29a and the end surface 29b is therefore darker than the brightness in a central portion of the light exit surface 56. The leakage of light from the end surfaces 29a and 29b is indicated schematically by the broken lines in FIG. 16B.

When the end surface 29a of the diffusion plate 50 of one illumination module 1 is put in close contact with the end surface 29b of another illumination module 1, on the other hand, light leaking from the end surface 29a of the left illumination module 1 enters the end surface 29b of the right illumination module 1 as illustrated in FIG. 16C (indicated by a counter-clockwise arrow in FIG. 16C). Light leaking from the end surface 29b of the right illumination module 1 enters the end surface 29a of the left illumination module 1 (indicated by the clockwise arrow in FIG. 16C).

Putting end surfaces of one illumination module 1 and another illumination module 1 that are on the sides where the LED light sources 30 are not disposed in close contact with each other thus prevents the brightness from dropping at a joint between the side-by-side illumination modules 1, and the resultant panel-type illumination device 91 is uniform in brightness on the light exit surface 56.

To put end surfaces of one illumination module 1 and another illumination module 1 that are on the sides where the LED light sources 30 are not disposed in close contact with each other as in this embodiment, the end surface 29a of the light guiding plate 20 of one illumination module 1 and the end surface 29b of the light guiding plate 20 of another illumination module 1 are made flush with the outer peripheral edges 59 of the diffusion plates 50 of the illumination modules 1 on the same sides as the end surfaces 29a and 29b. However, a slight gap created between the end surface 29a of the light guiding plate 20 of one illumination module 1 and the end surface 29b of the light guiding plate 20 of another illumination module 1 when the outer peripheral edges 59 of the two diffusion plates 50 are put in close contact with each other does not stop the panel-type illumination device 91 from having the effect described above.

While two illumination modules are placed side by side across and two illumination modules are placed side by side down, four illumination modules in total, in the example of FIG. 16A, the number of illumination modules used is not limited when the structure described above is employed, and a panel-type illumination device that is even larger in size can be provided. In FIG. 16A, the LED light sources 30 of the first light source portion 11 on the left side and the LED light sources 30 of the second light source portion 12 on the right side are staggered so that each LED light source 30 of the first light source portion 11 is level with a point between two LED light sources 30 of the second light source portion 12. This way, the drop in brightness between the LED light sources 30 of the first light source portion 11 can be complemented by the LED light sources 30 of the second light source portion 12. In the case where the LED light sources 30 of the first light source portion 11 on the left side is placed level with the LED light sources 30 of the second light source portion 12 on the right side (i.e., in the case where the LED light sources 30 of the second light source portion 12 is placed right across from the LED light sources 30 of the first light source portion 11), the drop in brightness at a joint between the adjacent light guiding plates 20 is still prevented and the brightness at a joint between the adjacent light guiding plates 20 is made equal to the brightness in a central portion of each first principal surface 23, which is a light exit surface of the light guiding plate 20.

The illumination module 9 of the ninth embodiment which is capable of emitting light from the front surface and the rear surface may be used in multitudes to build a large-sized panel-type illumination device that has the plurality of illumination modules 9 placed side by side and that is capable of emitting light from the front surface and the rear surface.

When placing the plurality of illumination modules 1 side by side, the height of the light exit surface 56 may be varied from one illumination module 1 to another within the extent of the thickness of each diffusion plate 50.

While the illumination module 1 of the first embodiment is used in the panel-type illumination device 90 and the panel-type illumination device 91 which are illustrated in FIG. 15 and FIG. 16 as examples, the same idea applies in creating large-sized illumination devices from illumination modules that are structured as described in the second embodiment to the eighth embodiment. Namely, in the panel-type illumination device 90 or the panel-type illumination device 91, one of the individual illumination modules 2-9 may be chosen instead of the individual illumination modules 1 or may be made them intermingled.

The diffusion plate 50, which is quadrangular in the plan view in the embodiments described above, may have a different polygonal shape such as a triangular shape or a pentagonal shape.

The light shielding portion 42, which is provided in the embodiments described above between the peripheral edge portion 26 and the light incident surface 52 (the second light incident surface) in order to restrict the amount of light that enters the light incident surface 52 after exiting the peripheral edge portion 26, may be omitted. In a structure that does not include the light shielding portion 42 also, providing the protruding part 51 in the diffusion plate 50 causes light exiting the peripheral edge portion 26 to enter the light incident surface 52 and then exit from a peripheral edge portion of the light exit surface 56. Light accordingly exits from the entire light exit surface 56. However, in the case where the amount of light that enters the light incident surface 52 needs to be adjusted, providing the light shielding portion 42 allows for an adjustment of the amount of light exiting the peripheral edge portion 26 (the first principal surface 23) that enters the light incident surface 52. In other words, the amount of light that exits from a peripheral edge portion of the light exit surface 56 of the diffusion plate 50 can be adjusted.

The light guiding plate 20 and the diffusion plate 50 contain light scattering particles to scatter light that travels inside the light guiding plate 20 and the diffusion plate 50. Light may be scattered also by forming, on the first principal surface 23, which is a light exit surface of the light guiding plate 20, and the light exit surface 56 of the diffusion plate 50, minute concave/convex shapes through surface roughening treatment, and convex lens-shaped, concave lens-shaped, or conical-shaped concaves/convexes or V-shaped grooves. Forming those minute concave/convex shapes enables the light guiding plate 20 and the diffusion plate 50 that do not contain light scattering particles and are accordingly transparent to scatter light on the first principal surface 23 and the light exit surface 56.

The light scattering particles can be formed from, for example, silicone particles described below. The light guiding plate 20, the diffusion plate 50, and the diffusion plate 80 (hereinafter referred to as "the light guiding plate 20 and others" or "the light guiding plate 20 or others") are light guiding members that are given a scattering power uniform in terms of volume, and contain a large number of globular particles as light scattering particles. Light that enters the interiors of the light guiding plate 20 and others is scattered by silicone particles (light scattering particles).

The Mie scattering theory, which provides a theoretical basis to the light scattering particles (silicone particles), is described. The Mie scattering theory involves obtaining a solution to a Maxwell's electromagnetic equation for a case where in a medium (matrix) that has a uniform refractive index, globular particles (light scattering particles) that have a different refractive index from that of the medium are present. An intensity distribution I (A, Θ) dependent on the angle of light scattered by the globular particles, which serve as light scattering particles, is expressed by Expression (1).

The symbol A represents a size parameter that indicates the optical size of each light scattering particle and is an amount corresponding to a radius r of the globular particle (light scattering particle) standardized by a wavelength λ of light in the matrix. An angle Θ is a scattering angle and is 0° in the same direction as the traveling direction of incident light.

Symbols $i_1$ and $i_2$ in Expression (1) represent values expressed by Expression (4). Symbols a and b that have a lower suffix "v" in Expressions (2) to (4) represent values expressed by Expression (5). A symbol P(cos Θ) with an upper suffix "1" and a lower suffix "v" is a Legendre polynomial. The symbols a and b that have a lower suffix "v" are expressed with the use of linear and quadratic Riccati-Bessel functions Ψ* and ξ* ("*" represents the lower suffix "v") and derived functions thereof. A symbol m represents the relative refractive index of the light scattering particle relative to the matrix, and has a relation with a refractive index $n_{matrix}$ of the matrix and a refractive index $n_{scatter}$ of the light scattering particle that is expressed by $M=n_{scatter}/n_{matrix}$.

$$I(A, \Theta) = \frac{\lambda^2}{8\pi^2}(i_1 + i_2) \quad (1)$$

$$K(A) = \left(\frac{2}{\alpha^2}\right)\sum_{v=1}^{\infty}(2v+1)(|a_v|^2 + |b_v|^2) \quad (2)$$

$$A = 2\pi r/\lambda \quad (3)$$

$$i_1 = \left|\sum_{v=1}^{\infty}\frac{2v+1}{v(v+1)}\left\{a_v\frac{P_v^1(\cos\Theta)}{\sin\Theta} + b_v\frac{dP_v^1(\cos\Theta)}{d\Theta}\right\}\right| \quad (4)$$

$$i_2 = \left|\sum_{v=1}^{\infty}\frac{2v+1}{v(v+1)}\left\{b_v\frac{P_v^1(\cos\Theta)}{\sin\Theta} + a_v\frac{dP_v^1(\cos\Theta)}{d\Theta}\right\}\right|$$

$$a_v = \frac{\Psi_v'(mA)\Psi_v(A) - m\Psi_v(mA)\Psi_v'(A)}{\Psi_v'(mA)\zeta_v(A) - m\Psi_v(mA)\zeta_v'(A)} \quad (5)$$

$$b_v = \frac{m\Psi_v'(mA)\Psi_v(A) - \Psi_v(mA)\Psi_v'(A)}{m\Psi_v'(mA)\zeta_v(A) - \Psi_v(mA)\zeta_v'(A)}$$

Figure 17:
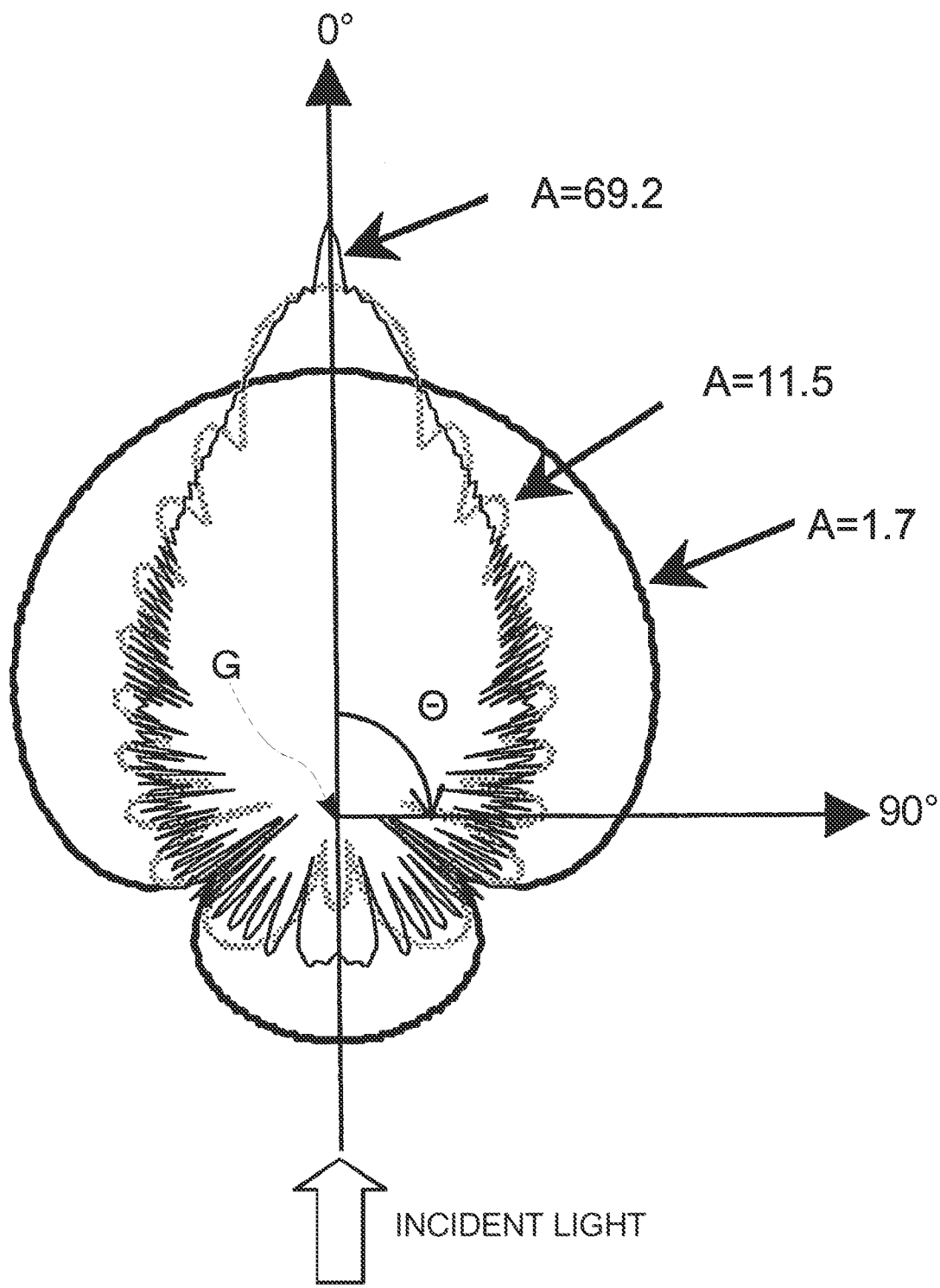
FIG. 17 is a graph for showing the angle distribution (A, Θ) of the intensity of scattered light that is scattered by a single spherical particle.

FIG. 17 is a graph for showing the intensity distribution I (A, Θ) of light scattered by a single spherical particle, based on Expressions (1) to (5). Shown in FIG. 17 is the angle distribution I (A, Θ) of the scattered light intensity that is observed when the spherical particle as a light scattering particle is located at an origin G and incident light enters from below in FIG. 17. The distance from the origin G to each curve indicates the scattered light intensity in the relevant scattering angle direction. One curve represents the scattered light intensity of when A is 1.7. Another curve represents the scattered light intensity of when A is 11.5. Still another curve represents the scattered light intensity of when A is 69.2. The scattered light intensity in FIG. 17 is expressed in logarithmic scale. For that reason, an intensity difference that seems slight in FIG. 17 is actually a very large difference.

It is understood from FIG. 17 that light is scattered with a higher directivity toward the top of FIG. 17 (the forward irradiation direction) as the size parameter A increases (at a certain wavelength λ, as the particle size of the spherical particle increases). Actually, when the wavelength λ of incident light is fixed, the angle distribution I (A, Θ) of the scattered light intensity can be controlled with the radius r of the light scattering particle and the medium-light scattering particle relative refractive index m as parameters.

When light enters the light guiding plate 20 and others that contain N of this single spherical particle, the light is scattered by some of the N spherical particles. The scattered light travels inside the light guiding plate 20 and others to be scattered again by some other spherical particles out of the N spherical particles. This scattering occurs a number of times in succession and then the light exits the light guiding plate 20 and others in the case where the light guiding plate 20 and others are doped with the particles at a certain volume concentration or more. A phenomenon in which scattered light is further scattered as this is called multiple scattering. It is not easy in multiple scattering to analyze by ray tracing with the use of a transparent polymer. However, the characteristics of light can be analyzed by tracing the behavior of light by the Monte Carlo method. According to this analysis, when incident light is unpolarized, a cumulative distribution function F (Θ) of the scattered angle is expressed by Expression (6).

$$F(\Theta) = \frac{\int_0^\Theta I(\Theta)\sin\Theta\,d\Theta}{\int_0^\pi I(\Theta)\sin\Theta\,d\Theta} \quad (6)$$

A symbol I (Θ) in Expression (6) indicates the intensity of light scattered by a spherical particle of the size parameter A which is expressed by Expression (1). In the case where light having an intensity $I_o$ enters the light guiding plate 20 and others and attenuates in intensity by scattering to I after being transmitted over a distance y, those relations are expressed by Expression (7).

$$\frac{I}{I_0} = \exp(-\tau y) \quad (7)$$

A symbol τ in Expression (7) is called turbidity, which corresponds to the scattering coefficient of the medium and is in proportion to the particle count N as in Expression (8). A symbol $\sigma^s$ in Expression (8) represents the scattering cross section.

$$\tau = \sigma^s N \quad (8)$$

From Expression (7), a probability $P_t(L)$ at which light is transmitted through the light guiding plate 20 or others over a length L without being scattered is expressed by Expression (9).

$$p_t(L) = \frac{I}{I_0} = \exp(-\sigma^s NL) \quad (9)$$

A probability $P_s$ (L) at which light is scattered before traveling over the light path length L, on the other hand, is expressed by Expression (10).

$$P_s(L) = 1 - P_t(L) = 1 - \exp(-\sigma^s NL) \quad (10)$$

As is understood from those expressions, the degree of multiple scattering in the light guiding plate 20 and others can be controlled by changing the turbidity τ.

It is concluded from the relational expressions given above that multiple scattering in the light guiding plate 20 and others can be controlled with at least one of the size parameter A of the light scattering particle and the turbidity τ as a parameter.

The light scattering particles contained in the light guiding plate 20 and others are, for example, light-transmissive silicon particles having a mean particle size of 2.4 µm. The turbidity τ, which is a scattering parameter corresponding to the coefficient of scattering by the light scattering particles can be set to 0.49 (λ=550 nm).

Tenth Embodiment

Figure 18:
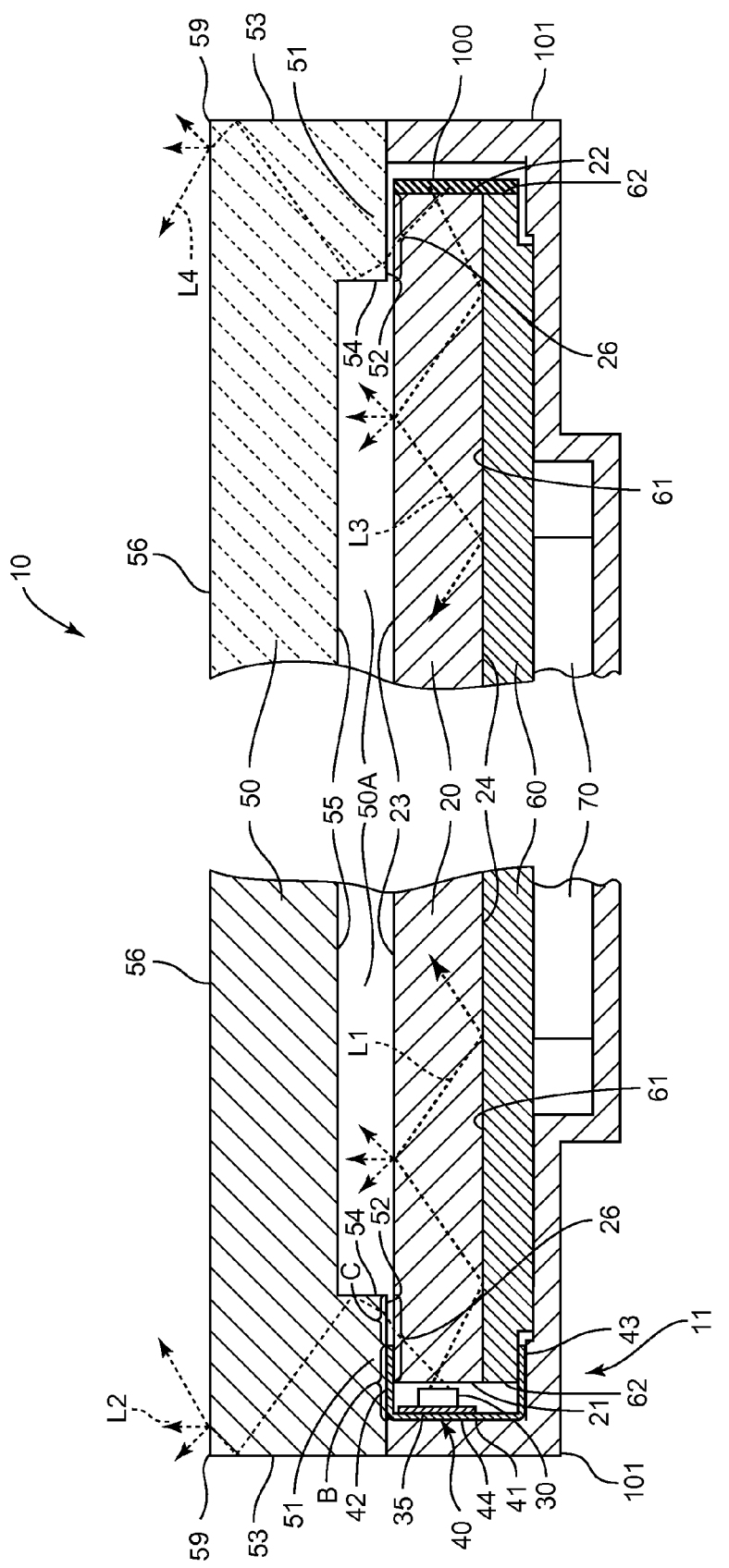
FIG. 18 is a partial sectional view for illustrating the structure of an illumination module according to a tenth embodiment of the present invention.
Figure 19:
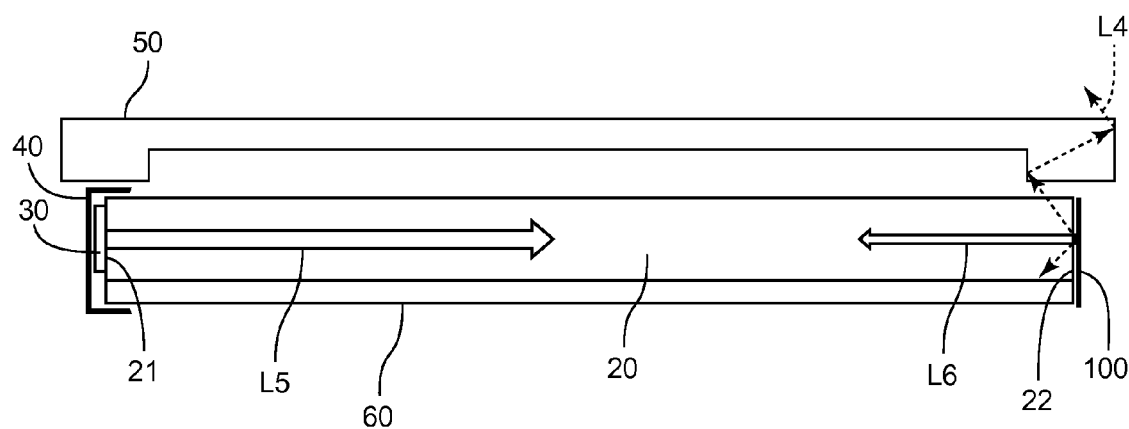
FIG. 19 is a diagram for illustrating the intensity of light that travels inside the illumination module of FIG. 18.

An illumination module 10 according to a tenth embodiment of the present invention is described next with reference to FIG. 18 and FIG. 19. Illustrated in FIG. 18 is the sectional structure of the illumination module 10 taken along a top-bottom direction (a plane vertical to the light exit surface 56 of the diffusion plate 50). For easier understanding, the left end and the right end are enlarged and the central portion is omitted in FIG. 18. FIG. 19 is a diagram for schematically illustrating how light travels and how the light is reflected in the illumination module 10. In FIG. 18 and FIG. 19, components that are the same as those of the illumination module 1 are denoted by the same reference symbols and descriptions thereof are omitted or simplified. While the protruding part 51 in the illumination module 1 according to this tenth embodiment is formed in each of a left peripheral edge portion and a right peripheral edge portion among the peripheral edge portions of the diffusion plate 50 which are on the sides where the LED light sources 30 are disposed, the protruding part 51 may formed along the entire outer periphery (four sides) of the diffusion plate 50. And, the protruding part 51 may formed only along the left outer periphery (one side) of the diffusion plate 50.

In the illumination modules 1 to 9 described above, the LED light sources 30 are provided along each of the end surface 21 and end surface 22 of the light guiding plate 20 which face each other. In the illumination module 10, on the other hand, a reflector plate 100 as a reflecting member is provided on the end surface 22 in place of the LED light sources 30. The illumination module 10 includes a holder case 101, which holds the light guiding plate 20, the LED light sources 30, the reflector plate 100, the control circuit 70, and others.

Light emitted by the LED light sources 30 and entering the light guiding plate 20 from the end surface 21 travels while being scattered by the light scattering particles in the light guiding plate 20 and while reflected totally and repeatedly by the principal surface 23 and the second principal surface 24 as described above. A part of the light traveling in the light guiding plate 20 exits from the first principal surface 23 toward the diffusion plate 50 in a diffused state. Another part of the light traveling in the light guiding plate 20 reaches the reflector plate 100 and is reflected by the reflector plate 100 back to the interior of the light guiding plate 20.

A part of the light reflected by the reflector plate 100 to the interior of the light guiding plate 20 travels in the light guiding plate 20, as indicated by the broken line L3, for example, similarly to light that is emitted by the LED light sources 30 and that subsequently enters the end surface 21, while being scattered by the light scattering particles in the light guiding plate 20 and while being reflected totally and repeatedly by the first principal surface 23 and the second principal surface 24 to exit from the first principal surface 23 toward the diffusion plate 50 in a diffused state. Another part of the light reflected by the reflector plate 100 to the interior of the light guiding plate 20 enters the interior of the protruding part 51 from the light incident surface 52, as indicated by the broken line L4, for example, and travels while being reflected totally by the internal side surface 54 and the outer peripheral end surface 53 of the protruding part 51 and while being scattered by the light scattering particles, to exit the light exit surface 56 of the diffusion plate 50, mainly from a portion above an area where the protruding part 51 is disposed, that is, a peripheral edge of the light exit surface 56 on the side where the reflector plate 100 is disposed, in a diffused state. This means that the illuminance of the diffusion plate 50 can be improved on the end surface 22 side without providing the LED light sources 30 along the end surface 22. The illumination module 10 having one set of the plurality of LED light sources 30 is thus reduced in the number of parts and simplified in structure compared to a structure that includes more than one set of the plurality of LED light sources 30.

The reflector plate 100 is made from, for example, an aluminum plate, and can be stuck by adhesion to the end surface 22 or mounted to the light guiding plate 20 via a holder (not shown). The reflector plate 100 may also be a coat of a reflective paint on the end surface 22.

In a structure that includes the LED light sources 30, the LED light sources 30 may appear like point light sources when viewed from the light exit surface 56 of the diffusion plate 50. To avoid this by preventing light that is emitted by the LED light sources 30 from directly entering the diffusion plate 50, the light shielding portion 42 is provided between the light guiding plate 20 and the protruding part 51 of the diffusion plate 50 on the side where the LED light sources 30 are provided along the end surface 21. However, light emitted by the LED light sources 30 and entering the interior of the light guiding plate 20 reaches the end surface 22 with the illuminance made uniform through scattering by the light scattering particles in the light guiding plate 20, or through other factors, and is then reflected by the reflector plate 100. The light shielding portion 42 therefore does not need to be provided on the end surface 22 side, unlike on the side where the LED light sources 30 are disposed along the end surface 21. The illumination module 10 is accordingly reduced in the number of parts and simplified in structure.

In a structure that includes the LED light sources 30, a peripheral portion off the light emitting direction of the LED light sources 30 (for example, an area between the LED light sources 30 that are adjacent to each other) may be dark, whereas a portion nearest to the light emitting direction is bright. To avoid this, the diffusion surfaces 25 are formed on the first principal surface 23 of the light guiding plate 20 on the end surface 21 side as illustrated in FIG. 8 and FIG. 9. However, light emitted by the LED light sources 30 and entering the interior of the light guiding plate 20 reaches the end surface 22 with the illuminance made uniform through scattering by the light scattering particles in the light guiding plate 20, or through other factors, and is then reflected by the reflector plate 100. The diffusion surfaces 25 therefore do not need to be formed on the first principal surface 23 of the light guiding plate 20 on the end surface 22 side, which simplifies the structure of the illumination module 10.

The difference between the illuminance on the end surface 21 side and the illuminance on the end surface 22 side can be reduced effectively by employing the following structure:

In a structure where the diffusion surfaces 25 are not formed in the light guiding plate 20, the reflectance of the reflector plate 100 and the concentration of the light scattering particles contained in the light guiding plate 20 are set so that the proportion of the amount of light that returns to the end surface 21 to the amount of light that enters the end surface 21 is equal to the proportion of the areal dimensions of dark areas between the adjacent LED light sources 30 to the areal dimensions of the first principal surface. The difference between the illuminance on the end surface 21 side and the illuminance on the end surface 22 side can be reduced in this manner. To give a specific example, the difference between the illuminance on the end surface 21 side and the illuminance on the end surface 22 side can be reduced favorably by setting light L5, which enters the end surface 21 from the LED light sources 30 and travels in the light guiding plate 20 as illustrated in FIG. 19, so that the amount of the light L5 upon arrival at the end surface 22 is 40% of the amount of the light L5 entering the end surface 21, and by setting the amount of light L6, which is reflected by the reflector plate 100 and reaches the end surface 21, to 15% of the amount of the light entering the end surface 21. The difference between the illuminance on the end surface 21 side and the illuminance on the end surface 22 side can be reduced if light L5, which enters the end surface 21 from the LED light sources 30 and travels in the light guiding plate 20, is set so that the amount of the light L5 upon arrival at the end surface 22 is 40% or less and 15% or more of the amount of the light L5 entering the end surface 21, and the amount of light L6, which is reflected by the reflector plate 100 and reaches the end surface 21, is set to 15% or less and 0.4% or more of the amount of the light entering the end surface 21.

Figure 20:
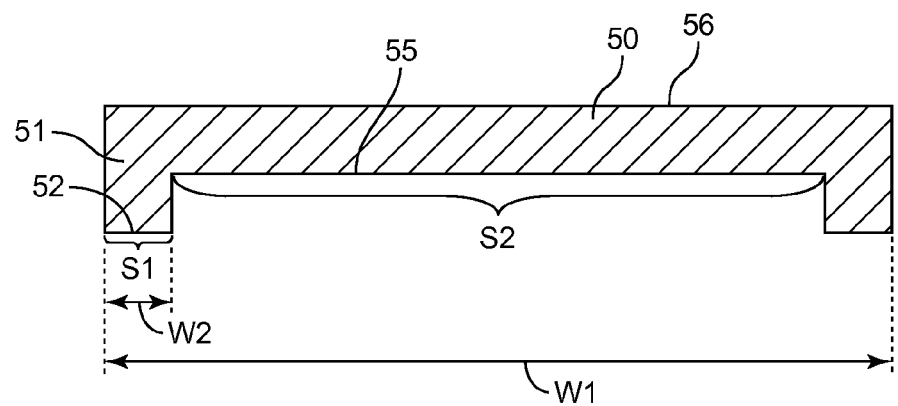
FIG. 20 is a diagram for illustrating the areal dimension ratio of a light incident surface and an internal bottom surface.

The illuminance distribution of the light exit surface 56 can be evened out favorably by setting the amount of light that enters the light incident surface 52 after entering from the end surface 21 along which the LED light sources 30 are disposed or from the end surface 22, in relation to the total amount of light that enters the diffusion plate 50 (a total incident amount M), as follows:

When the areal dimensions of each light incident surface 52 into which light entering from the end surface 21 or 22 enters is given as S1 and the areal dimensions of the internal bottom surface 55 is given as S2 as illustrated in FIG. 20, the illuminance distribution of the light exit surface 56 can be evened out favorably by allowing light to enter the light incident surface 52 in an amount expressed by [M·(S1/(S1+S2))].

A change in the amount of light by 30% or so is hardly recognizable as a change to average human vision. Therefore, setting the areal dimensions of the light incident surface 52 and the light exit surface 56 so that the amount of light that enters the light incident surface 52 is equal to or more than [0.7·M·(S1/(S1+S2))] and equal to or less than [1.3·M·(S1/(S1+S2))] makes it seem to a viewer as though light that has a uniform illuminance distribution is emitted from the light exit surface 56.

In the case where a plurality of illumination modules are used side by side in an illumination device as in FIG. 15, a change in the amount of light by about 60% is acceptable at a peripheral edge portion because of leakage of light from adjacent illumination modules. Therefore, setting the areal dimensions of the light incident surface 52 and the light exit surface 56 so that the amount of light that enters the light incident surface 52 is equal to or more than [0.4·M·(S1/(S1+S2))] and equal to or less than [1.6·M·(S1/(S1+S2))] makes it seem to a viewer as though light that has a uniform illuminance distribution is emitted from the light exit surface 56.

Figure 21:
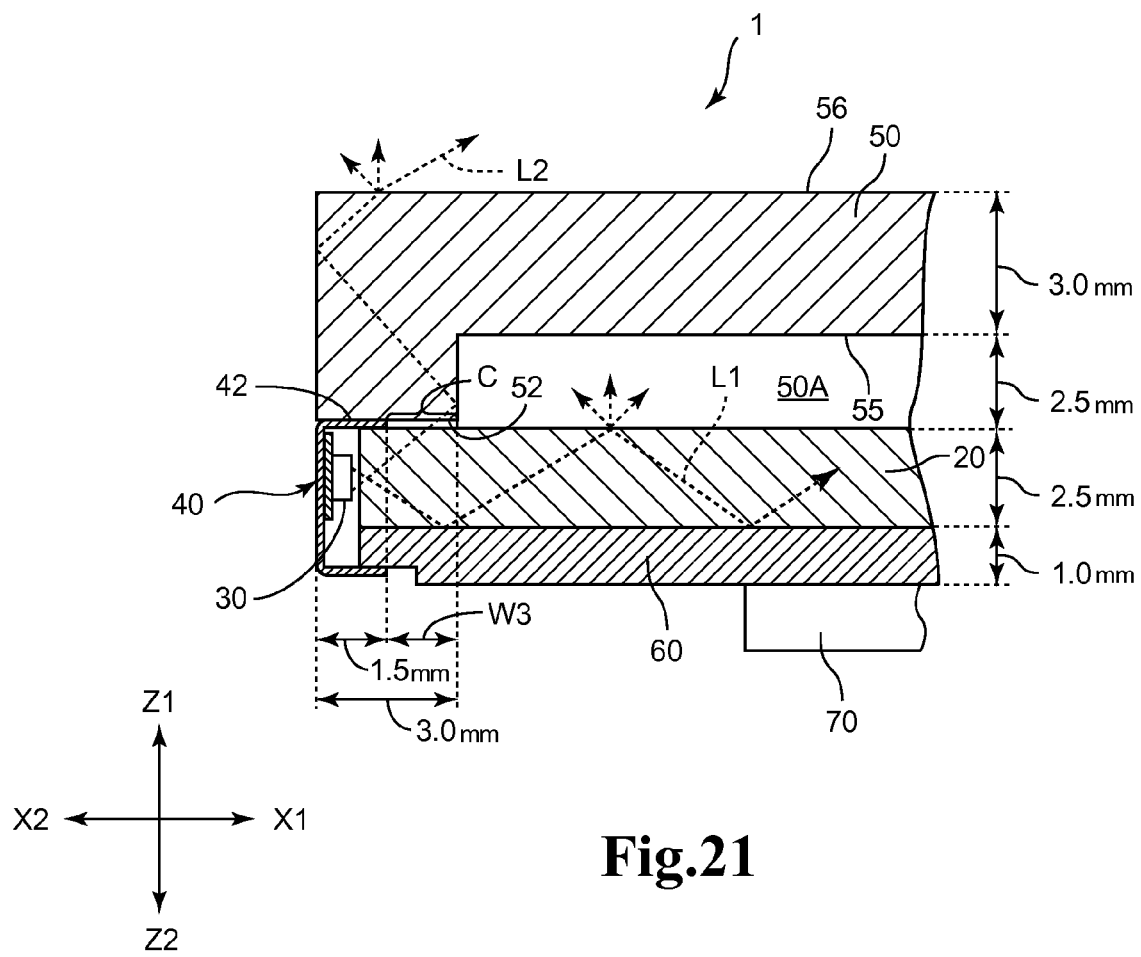
FIG. 21 is a diagram for illustrating a modification example of the tenth embodiment.

Employing a structure that is illustrated in FIG. 21 further evens out the illuminance distribution of light exiting from the light exit surface 56. Specifically, the light guiding plate 20 is made from a light scattering, light guiding member (HSOT) in which light scattering particles (HSOT) having a particle size of 7 μm are mixed at a concentration of 0.1 wt % in polymethyl methacrylate (PMMA: acrylic) as a parent material, and the diffusion plate 50 is made from a light scattering, light guiding member (HSOT) in which light scattering particles (HSOT) are mixed in a parent material that is PMMA or polycarbonate at a concentration that sets the mean free path to 0.1 mm or less. A width W1 (see FIG. 20) in the left-right direction of the diffusion plate 50 is set to 150 mm, a width W2 (see FIG. 20) in the left-right direction of the light incident surface 52 is set to 3 mm, and a width W3 in the left-right direction of the incident area C is set to 1.5 mm. This causes light to enter the protruding part 51 in an amount that is 2% of the total incident amount M, thereby favorably evening out the illuminance distribution of light that exits from the light exit surface 56. The amount of light expressed by [(S1/(S1+S2))] in relation to the total incident amount M corresponds to 2% of the total incident amount M. The concrete dimensions of the components of the illumination module 1 are illustrated in FIG. 21, where the thickness of the diffusion plate 50 is 3.0 mm, the depth of the recessed portion 50A is 2.5 mm, the thickness of the light guiding plate 20 is 2.5 mm, and the thickness of the reflector plate 60 is 1.0 mm.

The protruding part 51 in the illumination modules 1-10 according to the above embodiments is formed along the entire outer periphery (four sides) of the diffusion plate 50 or in each of a left peripheral edge portion and a right peripheral edge portion among the peripheral edge portions of the diffusion plate 50 which are on the sides where the LED light sources 30 are disposed or along only the one outer periphery (one side) of the diffusion plate 50. Forming the protruding part 51 along the entire outer periphery enhances the rigidity of the diffusion plate 50. The protruding part 51 may be formed to cover the LED light sources 30. In this case, the length of the protruding part 51 may be made the distance from one side of outer peripheral edge 59 to the other side of outer peripheral edge 59 equally and it may be done shorter than the distance of the above. While each protruding part 51 of the above embodiments is in the beam-like shape, the protruding part 51 may be intermittent protrusions and the protrusions cover the LED light sources 30.

What is claimed is:

1. An illumination module, comprising:
  a light guiding plate having an end surface and a first light exit surface;
  a light source aligned along the end surface, the light source being configured to emit light that enters the end surface; and
  a diffusion plate that is configured by a monolithic body, the light diffusion plate including:
    a main member having a light incident surface and a second light exit surface opposite to each other, the light incident surface directly facing the first light exit surface; and
    a protrusion that is provided at a peripheral edge of the diffusion plate, the protrusion having a protrusion top surface and a protrusion side surface, the protrusion top surface directly facing the first light exit surface,
    wherein the protrusion top surface, the protrusion side surface and the light incident surface continuously extend,
  wherein the light, which is exited from the first light exit surface of the light guiding plate, enters into the diffusion plate via the protrusion top surface, the protrusion side surface and the light incident surface.

2. The illumination module according to claim 1, further comprising:
a light shield, the light shield being provided between part of the protrusion top surface and part of the first light exit surface,
wherein the light shield is configured to control a light amount of the light which is exited from the first light exit surface and enters into the diffusion plate via the protrusion top surface.

3. The illumination module according to claim 2, further comprising:
a mounting member on which the light source is assembled so that the light source is mounted to the illumination module via the mounting member,
wherein the light shield is provided in the mounting member.

4. The illumination module according to claim 1, wherein the light source is configured with a plurality of light sources.

5. The illumination module according to claim 2,
wherein the light source is configured with a plurality of light sources,
the light shield is configured with shield protrusions and shield recesses which are alternatively provided with each other in a plan view along an alignment direction of the plurality of light sources, and
the plurality of light sources are disposed on the shield protrusions so that the plurality of light sources and the shield protrusions are overlapped with each other in the plan view.

6. The illumination module according to claim 4, wherein the protrusion side surface of the diffusion plate is wave-shaped, and the wave-shaped protrusion side surface extends along an alignment direction of the plurality of light sources.

7. The illumination module according to claim 4, wherein the protrusion top surface of the diffusion plate has a plurality of V-shaped grooves, and
the plurality of V-shaped grooves are arranged along an alignment direction of the plurality of light sources, and each of the plurality of V-shaped grooves extends in a direction perpendicular to the alignment direction of the plurality of light sources.

8. The illumination module according to claim 7, wherein the protrusion side surface of the diffusion plate is wave-shaped, and the wave-shaped protrusion side surface extends along the alignment direction of the plurality of light sources.

9. The illumination module according to claim 4, wherein a periphery of the first light exit surface of the light guiding plate has diffusion surfaces, and the diffusion surfaces directly face the protrusion side surface, and
each of the diffusion surfaces is disposed between two adjacent light sources of the plurality of light sources.

10. The illumination module according to claim 9, wherein
each of the diffusion surfaces has an aggregation of minute lens-shaped concaves and convexes or V-shaped grooves.

11. The illumination module according to claim 10, wherein
the aggregation of each of the diffusion surfaces has first and second end areas in a plan view, the first end area is closer to each of the plurality of light sources than the second end area, and
a density of the first end area of the aggregation is larger than a density of the second end area of the aggregation.

12. The illumination module according to claim 1, further comprising:
a mounting member on which the light source is assembled so that the light source is mounted to the illumination module via the mounting member,
wherein an outer peripheral end side surface of the diffusion plate is disposed in a same plane or a different plane,
an outer peripheral end side surface of the light guiding plate and an external side surface of the mounting member are disposed in the same plane, and
the different plane outwardly protrudes farther than the outer peripheral end side surface of the light guiding plate and the external side surface of the mounting member.

13. The illumination module according to claim 1, wherein
a ratio of an amount of the light that enters the protrusion top surface to a total amount of the light that enters the diffusion plate is within ±60% of a ratio of an area of the protrusion top surface to a total area of the diffusion plate which is a sum of areas of the light incident surface and the protrusion top surface.

14. The illumination module according to claim 1, wherein
the light source is an LED light source.

15. A panel-type illumination device, comprising a plurality of illumination modules according to claim 1, wherein
each of the plurality of illumination modules has first and second sides opposite to each other, and the light source is provided along the first side, and
the plurality of illumination modules are planarly arranged by contacting the second sides to each other.

16. An illumination module, comprising:
a light guiding plate having first and second end surfaces opposite to each other and a first light exit surface;
a light source aligned along the first end surface, the light source being configured to emit light that enters the first end surface;
a reflecting member disposed on the second end surface of the light guiding plate, the reflecting member being configured to reflect the light, which is emitted by the light source and entered into an interior of the light guiding plate via the first end surface, back to the interior of the light guiding plate; and
a diffusion plate that is configured by a monolithic body, the light diffusion plate including:
a main member having a light incident surface and a second light exit surface opposite to each other, the light incident surface directly facing the first light exit surface; and
a protrusion that is provided at a peripheral edge of the diffusion plate, the protrusion having a protrusion top surface and a protrusion side surface, the protrusion top surface directly facing the first light exit surface,
wherein the protrusion top surface, the protrusion side surface and the light incident surface continuously extend,
wherein the light, which is exited from the first light exit surface of the light guiding plate, enters into the diffusion plate via the protrusion top surface, the protrusion side surface and the light incident surface.

17. The illumination module according to claim 16, further comprising:
a light shield, the light shield being provided between part of the protrusion top surface and part of the first light exit surface,
wherein the light shield is configured to control a light amount of the light which is exited from the first light exit surface and enters into the diffusion plate via the protrusion top surface.

18. The illumination module according to claim 17, further comprising:
a mounting member on which the light source is assembled so that the light source is mounted to the illumination module via the mounting member,
wherein the light shield is provided in the mounting member.

19. The illumination module according to claim 16, wherein
the light source is configured with a plurality of light sources.

20. The illumination module according to claim 17,
wherein the light source is configured with a plurality of light sources,
the light shield is configured with shield protrusions and shield recesses which are alternatively provided with each other in a plan view along an alignment direction of the plurality of light sources, and
the plurality of light sources are disposed on the shield protrusions so that the plurality of light sources and the shield protrusions are overlapped with each other in the plan view.

21. The illumination module according to claim 19, wherein
the protrusion side surface of the diffusion plate is wave-shaped, and the wave-shaped protrusion side surface extends along an alignment direction of the plurality of light sources.

22. The illumination module according to claim 19, wherein
the protrusion top surface of the diffusion plate has a plurality of V-shaped grooves, and
the plurality of V-shaped grooves are arranged along an alignment direction of the plurality of light sources, and each of the plurality of V-shaped grooves extends in a direction perpendicular to the alignment direction of the plurality of light sources.

23. The illumination module according to claim 22, wherein
the protrusion side surface of the diffusion plate is wave-shaped, and the wave-shaped protrusion side surface extends along the alignment direction of the plurality of light sources.

24. The illumination module according to claim 19, wherein
a periphery of the first light exit surface of the light guiding plate has diffusion surfaces,
and the diffusion surfaces directly face the protrusion side surface, and each of the diffusion surfaces is disposed between two adjacent light sources of the plurality of light sources.

25. The illumination module according to claim 24, wherein
each of the diffusion surfaces has an aggregation of minute lens-shaped concaves and convexes or V-shaped grooves.

26. The illumination module according to claim 25, wherein
the aggregation of each of the diffusion surfaces has first and second end areas in a plan view, the first end area is closer to each of the plurality of light sources than the second end area, and
a density of the first end area of the aggregation is larger than a density of the second end area of the aggregation.

27. The illumination module according to claim 16, further comprising:
a mounting member on which the light source is assembled so that the light source is mounted to the illumination module via the mounting member,
wherein an outer peripheral end side surface of the diffusion plate is disposed in a same plane or a different plane,
an outer peripheral end side surface of the light guiding plate and an external side surface of the mounting member are disposed in the same plane, and
the different plane outwardly protrudes farther than the outer peripheral end side surface of the light guiding plate and the external side surface of the mounting member.

28. The illumination module according to claim 16, wherein
a ratio of an amount of the light that enters the protrusion top surface to a total amount of the light that enters the diffusion plate is within ±60% of a ratio of an area of the protrusion top surface to a total areas of the diffusion plate which is a sum of areas of the light incident surface and the protrusion top surface.

29. The illumination module according to claim 16, wherein
the light source is an LED light source.

30. A panel-type illumination device, comprising a plurality of illumination modules according to claim 16, wherein
each of the plurality of illumination modules has first and second sides opposite to each other, and the light source is provided along the first side, and
the plurality of illumination modules are planarly arranged by contacting the second sides to each other.

31. The illumination module according to claim 9, further comprising:
a mounting member on which the light source is assembled so that the light source is mounted to the illumination module via the mounting member,
wherein an outer peripheral end side surface of the diffusion plate is disposed in a same plane or a different plane,
an outer peripheral end side surface of the light guiding plate and an external side surface of the mounting member are disposed in the same plane, and
the different plane outwardly protrudes farther than the outer peripheral end side surface of the light guiding plate and the external side surface of the mounting member.

32. The illumination module according to claim 4, wherein
a ratio of an amount of the light that enters the protrusion top surface to a total amount of the light that enters the diffusion plate is within ±60% of a ratio of an area of the protrusion top surface to a total area of the diffusion plate which is a sum of areas of the light incident surface and the protrusion top surface.

33. The illumination module according to claim 24, further comprising:

a mounting member on which the light source is assembled so that the light source is mounted to the illumination module via the mounting member, wherein an outer peripheral end side surface of the diffusion plate is disposed in a same plane or a different plane, an outer peripheral end side surface of the light guiding plate and an external side surface of the mounting member are disposed in the same plane, and the different plane outwardly protrudes farther than the outer peripheral end surface of the light guiding plate and the external side surface of the mounting member.

34. The illumination module according to claim 19, wherein
a ratio of an amount of the light that enters the protrusion top surface to a total amount of the light that enters the diffusion plate is within ±60% of a ratio of an area of the protrusion top surface to a total area of the diffusion plate which is a sum of areas of the light incident surface and the protrusion top surface.

35. The illumination module according to claim 1,
wherein the peripheral edge of the diffusion plate is configured with first and second peripheral edges opposite to each other, and the protrusion of the diffusion plate is configured with first and second protrusions located at the first and second peripheral edges, respectively, and
the first and second protrusions have first and second protrusion top surfaces, respectively, and the first and second protrusion top surfaces directly face the first light exit surface of the light guiding plate.

36. The illumination module according to claim 16,
wherein the peripheral edge of the diffusion plate is configured with first and second peripheral edges opposite to each other, and the protrusion of the diffusion plate is configured with first and second protrusions located at the first and second peripheral edges, respectively, and
the first and second protrusions have first and second protrusion top surfaces, respectively, and the first and second protrusion top surfaces directly face the first light exit surface of the light guiding plate.

37. The illumination module according to claim 1,
wherein the peripheral edge of the diffusion plate is configured with first, second, third, and fourth peripheral edges provided at four sides of the diffusion plate, and the protrusion of the diffusion plate is configured with first, second, third, and fourth protrusions located at the first, second, third, and fourth peripheral edges, respectively, and
the first, second, third, and fourth protrusions have first, second, third, and fourth protrusion top surfaces, respectively, and the first, second, third, and fourth protrusion top surfaces directly face the first light exit surface of the light guiding plate.

38. The illumination module according to claim 16,
wherein the peripheral edge of the diffusion plate is configured with first, second, third, and fourth peripheral edges provided at four sides of the diffusion plate, and the protrusion of the diffusion plate is configured with first, second, third, and fourth protrusions located at the first, second, third, and fourth peripheral edges, respectively, and
the first, second, third, and fourth protrusions have first, second, third, and fourth protrusion top surfaces, respectively, and the first, second, third, and fourth protrusion top surfaces directly face the first light exit surface of the light guiding plate.

\* \* \* \* \*